(12) United States Patent
Zheng et al.

(10) Patent No.: US 10,734,641 B2
(45) Date of Patent: Aug. 4, 2020

(54) HIGH CAPACITY AND STABLE CATHODE MATERIALS

(71) Applicant: Battelle Memorial Institute, Richland, WA (US)

(72) Inventors: Jianming Zheng, Richland, WA (US); Jiguang Zhang, Richland, WA (US); Pengfei Yan, Richland, WA (US); Chongmin Wang, Richland, WA (US); Wengao Zhao, Richland, WA (US); Shuru Chen, Troy, MI (US); Wu Xu, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 52 days.

(21) Appl. No.: 16/284,335

(22) Filed: Feb. 25, 2019

(65) Prior Publication Data

US 2019/0190016 A1 Jun. 20, 2019

Related U.S. Application Data

(62) Division of application No. 15/597,025, filed on May 16, 2017, now Pat. No. 10,243,206.
(Continued)

(51) Int. Cl.
*H01M 4/36* (2006.01)
*H01M 4/505* (2010.01)
(Continued)

(52) U.S. Cl.
CPC ........... *H01M 4/364* (2013.01); *H01M 4/505* (2013.01); *H01M 4/525* (2013.01); *H01M 4/5825* (2013.01); *H01M 10/052* (2013.01); *H01M 10/0525* (2013.01); *H01M 10/0567* (2013.01); *H01M 10/0568* (2013.01); *H01M 10/0569* (2013.01); *H01M 2004/028* (2013.01); *H01M 2300/0037* (2013.01)

(58) Field of Classification Search
CPC ............ H01M 4/364; H01M 10/0567; H01M 10/052; H01M 10/0525; H01M 4/5825; H01M 4/525; H01M 4/505
See application file for complete search history.

(56) References Cited

U.S. PATENT DOCUMENTS

2016/0211517 A1* 7/2016 Beck ................... H01M 4/131
2016/0211553 A1 7/2016 Ito et al.
2016/0308206 A1 10/2016 Bi et al.

* cited by examiner

*Primary Examiner* — Stewart A Fraser
(74) *Attorney, Agent, or Firm* — Klarquist Sparkman, LLP

(57) ABSTRACT

High energy density cathode materials, such as $LiNi_xMn_yCo_zO_2$ (NMC) cathode materials, with improved discharge capacity (hence energy density) and enhanced cycle life are described. A solid electrolyte, such as lithium phosphate infused inside of secondary particles of the cathode material demonstrates significantly enhanced structural integrity without significant or without any observable particle cracking occurring during charge/discharge processes, showing high capacity retention of more than 90% after 200 cycles at room temperature. In certain embodiments the disclosed cathode materials (and cathodes made therefrom) are formed using nickel-rich NMC and/or are used in a battery system with a non-aqueous dual-Li salt electrolytes.

13 Claims, 18 Drawing Sheets
(15 of 18 Drawing Sheet(s) Filed in Color)

Related U.S. Application Data

(60) Provisional application No. 62/337,728, filed on May 17, 2016, provisional application No. 62/459,139, filed on Feb. 15, 2017.

(51) Int. Cl.
*H01M 4/525* (2010.01)
*H01M 4/58* (2010.01)
*H01M 10/0525* (2010.01)
*H01M 10/0568* (2010.01)
*H01M 10/0569* (2010.01)
*H01M 10/052* (2010.01)
*H01M 10/0567* (2010.01)
*H01M 4/02* (2006.01)

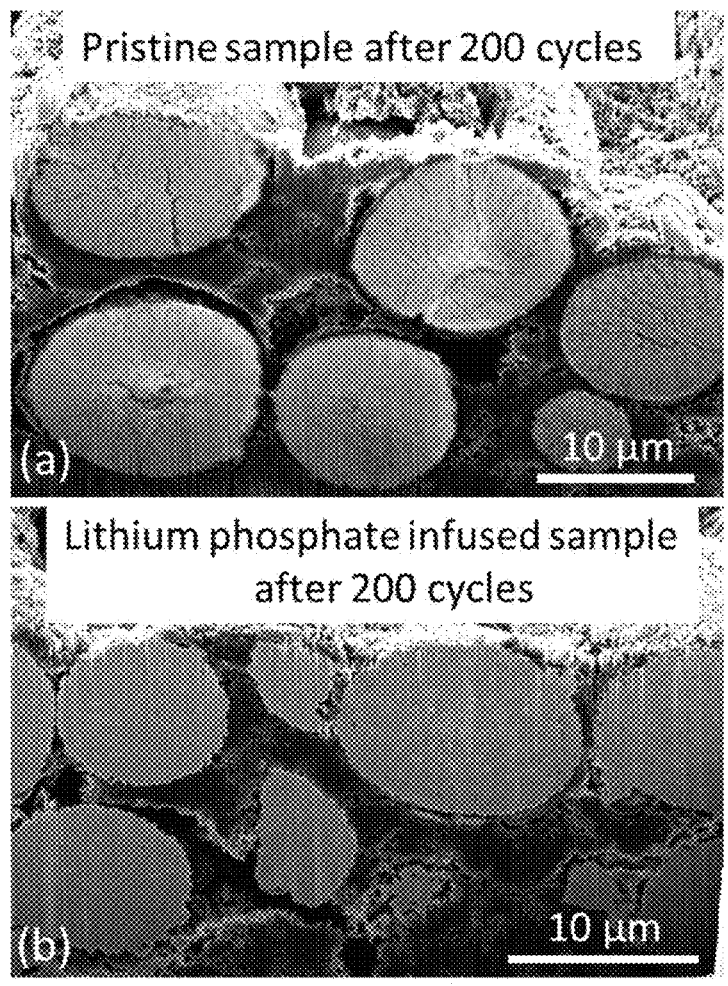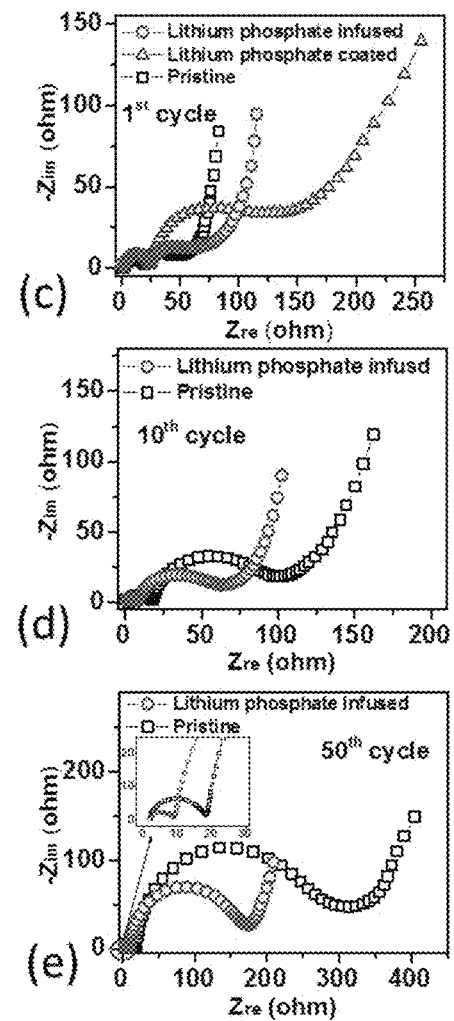
FIGS. 5a - 5e

HIGH CAPACITY AND STABLE CATHODE MATERIALS

CROSS REFERENCE TO RELATED APPLICATION

This application is a divisional of U.S. patent application Ser. No. 15/597,025, filed May 16, 2017, which claims the benefit of U.S. Provisional Patent Application No. 62/459,139, filed Feb. 15, 2017, and the benefit of U.S. Provisional Patent Application No. 62/337,728, filed May 17, 2016, both of which are hereby incorporated by reference.

ACKNOWLEDGMENT OF GOVERNMENT SUPPORT

This invention was made with government support under Contract DE-AC0576RL01830 awarded by the U.S. Department of Energy. The government has certain rights in the invention.

FIELD

The present disclosure relates to cathode materials, cathodes, Li-battery systems using such cathodes, and methods of making the same, particularly to nickel-rich cathode materials, cathodes and Li-battery systems using the same, such as nickel-rich NMC cathode materials and cathodes, typically for a lithium-ion or a lithium-metal battery.

BACKGROUND

Nickel-rich cathode materials, such as $LiNi_xMn_yCo_zO_2$ (NMC) have received great attention as promising cathode materials, with NMC especially of interest due to its high achievable discharge capacity (>200 mAh g$^{-1}$), and improved energy density (>800 Wh kg$^{-1}$) in comparison with traditional $LiCoO_2$ (~570 Wh kg$^{-1}$) and spinel $LiMn_2O_4$ (~440 Wh kg$^{-1}$). However, there are challenges hindering the use of Ni-rich NMC cathode materials and cathodes made therefrom. These include but are not limited to (i) Li/Ni cation mixing due to the difficulty in maintaining all the Ni in a 3$^+$ valence state, (ii) the degradation of structural integration due to lattice transformation, strain relaxation and/or crack formation, (iii) safety concerns ascribed to aggressive thermal reactions between the delithiated Ni-rich NMC materials and organic carbonate electrolytes. While a number of approaches have been tried to address such problems, there remains a need for an improved nickel-rich NMC cathode material, particularly to one not susceptible to cracking while also maintaining superior electrochemical performance.

SUMMARY

Disclosed are lithium phosphate infused Ni-rich $LiNi_xMn_yCo_zO_2$ (NMC) cathode materials, cathodes, battery systems using the same and methods for making the same. The inventors determined that embodiments of the disclosed lithium phosphate infused Ni-rich NMC cathode materials and cathodes therefrom, successfully suppress cracking in the cathodes during electrochemical cycling and provide significantly superior cycle stability of this Ni-rich cathode material. The inventors have determined that the internal strain and subsequent electrolyte penetration into secondary particles is a key facilitator of crack formation in cathode material during cycling. The disclosed lithium phosphate infused Ni-rich NMC cathode materials differ in structure from conventional lithium phosphate coated Ni-rich NMC materials, and provide a different protection mechanism as well. The disclosed lithium phosphate infused secondary particles significantly buffer the strain that is generated during deep delithiation, reduce or prevent electrolyte penetration by blocking the intergranular percolation pathways in the particles. The protection mechanism of the new cathode materials provides a new flexibility for both methods and materials that are used for cathode protection and opens new design avenues for the development of high performance cathode materials for high-energy-density lithium battery systems.

Disclosed are embodiments of cathode materials, cathodes made therefrom and battery systems using the cathodes. In one embodiment a cathode material comprises $LiNi_xMn_yCo_zO_2$ (NMC) primary and secondary particles, wherein X+Y+Z=1; and the secondary particles having lithium phosphate diffused within the secondary particles. In certain embodiments the NMC is nickel-rich NMC and $0.95 \geq X \geq 0.5$, Y is from 0.025 to 0.3 and Z is from 0.025 to 0.2. In certain embodiments the secondary particles further include a coating of lithium phosphate on an outer surface. In certain embodiments the lithium phosphate is diffused at least into the mantle of the secondary particles. In certain embodiments the lithium phosphate material is diffused into inner cores of the secondary particles. In certain embodiments the lithium phosphate coating has been annealed prior to cycling the cathode in a battery system. In certain embodiments the secondary particles do not include carbon and/or fluoride in the mantle after the cathode material is cycled at least 5 times in a lithium-ion or a lithium metal battery system. In certain embodiments the NMC composition comprises where X is from 0.6 to 0.9, Y is from 0.1 to 0.2 and Z is from 0.07 to 0.15 or comprises where X is from 0.65 to 0.85, Y is from 0.1 to 0.15 and Z is from 0.1 to 0.15. In certain embodiments the NMC comprises $LiNi_{0.33}Mn_{0.33}Co_{0.33}O_2$, $LiNi_{0.5}Mn_{0.3}Co_{0.2}O_2$, $LiNi_{0.5}Mn_{0.25}Co_{0.25}O_2$, $LiNi_{0.52}Mn_{0.32}Co_{0.16}O_2$, $LiNi_{0.55}Mn_{0.30}Co_{0.15}O_2$, $LiNi_{0.58}Mn_{0.14}Co_{0.28}O_2$, $LiNi_{0.6}Mn_{0.2}Co_{0.2}O_2$, $LiNi_{0.64}Mn_{0.18}Co_{0.18}O_2$, $LiNi_{0.65}Mn_{0.27}Co_{0.08}O_2$, $LiNi_{0.7}Mn_{0.2}Co_{0.1}O_2$, $LiNi_{0.7}Mn_{0.15}Co_{0.15}O_2$, $LiNi_{0.72}Mn_{0.10}Co_{0.18}O_2$, $LiNi_{0.76}Mn_{0.14}Co_{0.10}O_2$, $LiNi_{0.8}Mn_{0.1}Co_{0.1}O_2$, $LiNi_{0.86}Mn_{0.04}Co_{0.10}O_2$, $LiNi_{0.9}Mn_{0.05}Co_{0.05}O_2$, $LiNi_{0.95}Mn_{0.025}Co_{0.025}O_2$, or any combination thereof. In certain embodiments a cathode formed of the cathode material provides a discharge capacity greater than 200 mAh g$^{-1}$ and retains at least 90% of its capacity after at least 150 cycles in a lithium-ion battery system. In certain embodiments the secondary particles have a lithium phosphate concentration gradient wherein the lithium phosphate concentration in the secondary particles is greatest at outer regions of the secondary particles and lowest at inner regions of the secondary particles.

In other embodiments a cathode comprises a cathode material comprising an NMC having primary and secondary particles, wherein the secondary particles are formed of a plurality of primary particles and the secondary particles have lithium phosphate substantially uniformly distributed among grain boundaries of the primary particles within the secondary particles. In certain embodiments the NMC is nickel-rich NMC and the secondary particles of the NMC do not significantly change morphology after at least 150 cycles in a lithium-ion or a lithium-metal battery system.

Also disclosed are lithium battery comprising NMC having primary and secondary particles, the secondary particles formed of multiple primary particles, spaces between the primary particles within the secondary particles, lithium phosphate diffused into the spaces between the primary particles within the secondary particles, and an electrolyte comprising a mixture of two lithium salts, an additive, and a solvent mixture that forms solid electrolyte interphase layers. In certain embodiments the two lithium salts comprise lithium imide and lithium orthoborate in an organic solvent mixture. In certain embodiments the two lithium salts comprise lithium bis(trifluoromethanesulfonyl)imide (LiTFSI), lithium bis(fluorosulfonyl)imide (LiFSI), lithium bis(pentafluoroethyanesulfonyl)imide (LiBETI) and any mixture thereof; lithium bis(oxalato)borate (LiBOB), lithium difluoro(oxalato)borate (LiDFOB) and any mixture thereof. In certain embodiments the additive comprises $LiPF_6$, $NaPF_6$, $KPF_6$, $CsPF_6$, $LiBF_4$, $LiAsF_6$, $LiSbF_6$, $LiAlF_4$, vinylene carbonate (VC), fluoroethylene carbonate (FEC), vinyl ethylene carbonate (VEC), methylene ethylene carbonate (MEC), tetrafluoroethylene carbonate (TFEC), trifluoropropylene carbonate (TFPC), 1,3-propylsultone, 1,4-butylsultone, or any mixture thereof. In certain embodiments the solvent comprises carbonate, ethylene carbonate (EC), propylene carbonate (PC), diethyl carbonate (DEC), dimethyl carbonate (DMC), ethyl methyl carbonate (EMC), dipropyl carbonate (DPC), di(2,2,2-trifluoroethyl) carbonate (DTFEC), or any mixture thereof, a sulfone, dimethyl sulfone (DMS), ethyl methyl sulfone (EMS), tetramethylene sulfone; carboxylates, methyl butyrate (MB), ethyl propionate (EP); a phosphate, trimethyl phosphate, triethyl phosphate, tributyl phosphate, triphenyl phosphate, tris(2,2,2-trifluoroethyl) phosphate; phosphites such as triphenyl phosphite, tris(2,2,2-trifluoroethyl) phosphite, an ether, nonafluorobutyl methyl ether, nonafluorobutyl ethyl ether, a nitrile, butyronitrile, succinonitrile, or any mixture thereof.

Also disclosed are certain embodiments of a method for making a lithium battery cathode, comprising providing an NMC precursor; combining the NMC precursor with a lithium source to form a mixture; sintering the NMC precursor and lithium source mixture to form a nickel-rich NMC particles; coating the NMC particles with lithium phosphate; heating the lithium phosphate coated NMC particles in an environment at a temperature between from 600° C. to 800° C. to infuse lithium phosphate from the coating into the NMC cathode material; and forming a cathode from the lithium phosphate infused NMC cathode material. In certain embodiments the lithium source is LiOH, $Li_2CO_3$, $LiNO_3$, $Li_2CO_3$, lithium acetate, or any mixture thereof. In certain embodiments the NMC used in the method is nickel-rich NMC. In certain embodiments the NMC precursor is $NMC(OH)_2$. In certain embodiments the precursor NMC $(OH)_2$ is combined with a the phosphate source to form a mixture which is then sintered at high temperature to form lithium phosphate coated $NMC(OH)_2$. In certain embodiments the lithium phosphate coated nickel-rich NMC particles are annealed to form the lithium phosphate infused NMC cathode material.

The purpose of the foregoing Summary and the latter Abstract are to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The Abstract is neither intended to define the invention of the application nor is it intended to be limiting as to the scope of the claims in any way.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 2a-2b are secondary particles, and FIGS. 2c-2d show the details of primary particles.

FIGS. 2e and 2h are for pristine NMC, FIGS. 2f and 2i are for lithium phosphate-coated NMC, and FIGS. 2g and 2j are for lithium phosphate-infused NMC (specifically) $LiNi_{0.76}Mn_{0.14}Co_{0.10}O_2$ cathodes: (e-g) show secondary particles (10-15 um), (h, j) show the details of primary particles (100-500 nm).

FIG. 3a shows long-term cycling performance of an embodiment of the disclosed lithium phosphate-coated/infused NMC (comprising a $LiNi_{0.76}Mn_{0.14}Co_{0.10}O_2$) cathode material versus pristine NMC and lithium phosphate-coated NMC at C/3 after 3 formation cycles at C/10 over the voltage range of 2.7-4.5 V at room temperature, FIGS. 3b-3c show the corresponding charge/discharge voltage profile evolution of (b) pristine and (c) lithium phosphate-infused $LiNi_{0.76}Mn_{0.14}Co_{0.10}O_2$ cathode materials. FIG. 3d shows the long-term cycling performance of $LiNi_{0.76}Mn_{0.14}Co_{0.10}O_2$ cathode materials at C/2 after 3 formation cycle at C/5 over the voltage range of 2.7-4.5 V at 60° C.

FIGS. 4a and 4b are STEM-EDS mappings from a lithium phosphate-coated (by the ALD method) material with a scale bar of 500 nm. FIGS. 4c-4f are STEM-EDS mappings from the lithium phosphate infused NMC material with a scale bar of 1 μm and 20 nm in 4c and 4e, respectively, FIG. 4g is a schematic illustration showing modification of a secondary particle after coating and after annealing to obtain the lithium phosphate infused particle.

FIGS. 5a-5e. Shown are cross-sectional SEM images of FIG. 5a pristine material ($LiNi_{0.76}Mn_{0.14}Co_{0.10}O_2$) after 200 cycles and FIG. 5b a lithium phosphate-infused embodiment of the disclosed cathodes after 200 cycles. FIGS. 5c-5e show the impedance evolution during cycling.

FIGS. 7j-7l are STEM-HAADF lattice images from the red areas in 7g-7i and the yellow arrows in 7h and 7k highlight changes at surface and inner bulk. The scale bars are 500 nm in 7d-7f, 100 nm in 7g-7i and 2 nm in in 7j-7l, respectively.

FIGS. 9a and 9e are a pristine material and FIGS. 9b and 9f are 0.5 wt % lithium phosphate-infused Ni-rich NMC material, FIGS. 9c and 9g are 1 wt % lithium phosphate-infused Ni-rich NMC materials, and FIGS. 9d and 9h are 2 wt % lithium phosphate-infused, Ni-rich $LiNi_{0.76}Mn_{0.14}Co_{0.10}O_2$, based on the disclosed hydroxide precursor coating method.

FIG. 10a shows initial charge/discharge profiles, FIG. 10b shows discharge capacity vs. cycle number, and FIG. 10c shows capacity retention vs. cycle number for embodiments of the lithium phosphate-infused Ni-rich $LiNi_{0.76}Mn_{0.14}Co_{0.10}O_2$, based on the disclosed hydroxide precursor coating method.

FIG. 13a shows initial charge/discharge profiles, FIG. 13b shows discharge capacity vs. cycle number, and FIG. 13c shows capacity retention vs. cycle number for embodiments of the lithium phosphate-infused Ni-rich $LiNi_{0.76}Mn_{0.14}Co_{0.10}O_2$, based on the final $LiNi_{0.76}Mn_{0.14}Co_{0.10}O_2$ cathode material coating method disclosed.

FIG. 14a provides a schematic illustration showing the structural modification with lithium phosphate of an embodiment of the disclosed solid mixing method starting from an $NMC(OH)_2$ precursor and going to an annealed lithium phosphate infused secondary NMC particle and FIG. 14b provides a schematic illustration showing the structural modification with lithium phosphate infused by the solid mixing method starting from an embodiment of the disclosed cathode materials.

DETAILED DESCRIPTION

Figure 1:
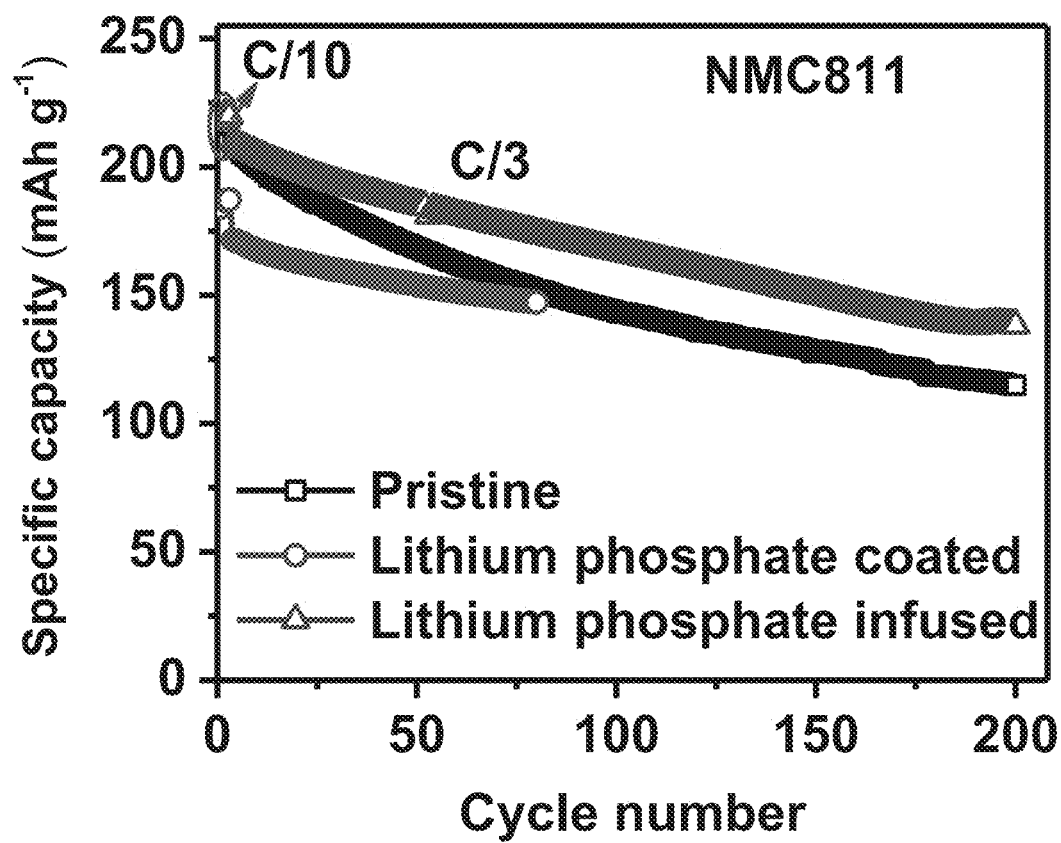
FIG. 1 is a graph showing long-term cycling performance of an embodiment of the disclosed lithium phosphate coated and then lithium phosphate-infused cathode, using $LiNi_{0.80}Mn_{0.10}Co_{0.10}O_2$ (NMC811), versus an lithium phosphate coated NMC (coated NMC811) and versus an untreated NMC (i.e., pristine NMC811), at C/3 after 3 formation cycles at C/10 over the voltage range of 2.7-4.5 V, and at room temperature.

Disclosed are embodiments of lithium phosphate infused nickel-rich NMC cathode materials and cathodes utilizing the same. Also disclosed are methods for make the lithium phosphate infused nickel-rich NMC cathode materials and cathodes.

Also disclosed are high-energy density lithium battery systems using embodiments of the disclosed lithium phosphate infused nickel-rich NMC cathodes which provide enhanced stability. In certain embodiments the disclosed lithium battery systems combine the embodiments of the disclosed lithium phosphate infused nickel-rich NMC cathodes (also referred to herein as "LP-infused" NMC or "LPO infused" NMC) with a dual-salt electrolyte composition with additives. Certain embodiments of the disclosed cathode materials address structural and interfacial stability problems found in conventional nickel-rich NMC materials, and/or enable stable operation of Ni-rich NMC cathodes with higher discharge capacity. Certain embodiments of the disclosed cathode materials provide stable operation of Ni-rich NMC cathodes with both high discharge capacity and improved long-term cycling stability.

In certain embodiments the LPO-infused NMC cathode materials are made using a lithium phosphate solid electrolyte atomic layer deposition (ALD) and infusion technique to modify the particle interface of the disclosed LPO-infused NMC cathode materials. In certain embodiments the LPO-infusion is performed by annealing the ALD deposited lithium phosphate cathode materials. The inventors have determined that the disclosed methods form a lithium-phosphate infused grain boundaries among the primary particles and form an integrated surface layer that prevents electrolyte diffusion into the inside of secondary particles of the NMC. The thin LPO-infused grain boundaries enhance the interfacial and structural stability of different Ni-rich NMC cathodes. Embodiments of the disclosed LPO-infused NMC cathode materials aid in preventing or suppressing cracking of the NMC cathodes during deep delithiation processes, and improve their electrochemical performances even under harsh cycling conditions, such as at as high of a charge of 4.5 V and at temperatures as high as 60° C. Further, the $Li_3PO_4$ diffuses into the 'crust' and 'mantle' or even into the 'inner core' of the secondary particles of Ni-rich NMC cathode material to function as a 'glue' that significantly enhances structural integrity of NMC secondary particles. In a certain embodiment the LPO-infused NMC cathodes provide high capacity retention of as high as at least, 91.6%, or 91.5% after as many as 200 cycles at room temperature. Further, embodiments of the disclosed cathode materials, cathodes and lithium battery systems cycle with no significant particle cracking occurring during long-term cycling, which is in sharp contrast to the significant particle cracking observed for cycled untreated nickel-rich NMC cathode materials and cathodes. Embodiments of the disclosed LPO-infused NMC cathode materials and cathodes may also improve the storage stability (reduced sensitivity to ambient moisture), thermal stability (mitigated heat reaction with electrolyte) and significantly inhibit or prevent dissolution of transition metal ions, particularly manganese ions (e.g., $Mn^{2+}$).

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

To facilitate review of the various embodiments of the disclosure, the following explanations of specific terms are provided:

Cathode: An electrode through which electric charge flows out of a polarized electrical device. From an electrochemical point of view in a rechargeable battery, positively charged cations move toward the cathode during discharge to balance the electrons arriving from external circuitry. When the battery is recharged, positively charged cations move toward the anode where electrons flow in.

Cell: As used herein, a cell refers to an electrochemical device used for generating a voltage or current from a chemical reaction, or the reverse in which a chemical reaction is induced by a current. Examples include voltaic cells, electrolytic cells, redox flow cells, and fuel cells, among others. Multiple single cells can form a cell assembly, often termed a stack. A battery includes one or more cells, or even one or more stacks.

Coulombic efficiency (CE): The efficiency with which charges are transferred in a system facilitating an electrochemical reaction. CE may be defined as the amount of charge exiting the battery during the discharge cycle divided by the amount of charge entering the battery during the charging cycle.

Electrolyte: A substance containing free ions that behaves as an ionically conductive medium. Electrolytes generally comprise ions in a solution, but molten electrolytes and solid electrolytes also are known.

Lithium-metal battery as used herein means a rechargeable battery that has lithium as an anode.

Lithium-ion battery (or Li-ion battery) as used herein means a type of rechargeable battery in which lithium ions move from the negative electrode to the positive electrode during discharge and back when charging. Li-ion batteries use an intercalated lithium compound as anode, compared to the metallic lithium used in a rechargeable lithium battery.

NMC refers to a lithium nickel manganese-cobalt oxide.

NMC Primary particle as used herein means the identifiable nanosized subunit that agglomerates to form micron size large secondary particles by physical interaction.

NMC Secondary particle as used herein means those micron size large units formed by agglomerating the primary particles by physical interaction.

Particle Crust as used herein means outermost shell part of a secondary particle (from 0 to 20% and/or 0 to 2 um in depth).

Particle Mantle as used herein means the intermediate part of a secondary particle (from 20 to 50% and/or 2 to 5 um in depth).

Particle Inner Core as used herein means the innermost part of a secondary particle (from 50 to 100% and/or >5 um in depth).

Significant (or Substantial) Particle Cracking, as used herein means a secondary particles are broken down into smaller separated pieces due to the build-up of internal strain that is generated during deep delithiation of NMC crystal lattice, "Significant" cracking means that the cracks, i.e. separations between primary particles, could be obviously observed (by SEM) throughout more than 50% of the cross sectional view of the cycled secondary particles.

Long-Term Cycling as used herein means at least 150 cycles of a lithium-ion battery system, wherein "a cycle" is a full charge and a full discharge of the battery.

Grain boundary (GB) as used herein means the interface between two grains. Grain boundary is a transition region in which some atoms are not exactly aligned with either grain.

Lithium Phosphate Infused (also referred to herein as "diffused," "penetrated" and/or "infiltrated" or "infused lithium phosphate") as used herein means that open spaces within the secondary particles are partially or fully permeated or filled with lithium phosphate, "Lithium phosphate infused" particles differ from "lithium phosphate coated" particles in that a "coating" means the lithium phosphate is not present within the particle crust or mantle or inner core, and/or is primarily on the outermost surface of the particle; or "lithium phosphate infused" particles may be differentiated from "lithium phosphate coated" particles in that the grain boundary of a significant portion of primary particles inside of an "infused" secondary particle are diffused or filled with lithium phosphate, such as over 50% of the grain boundaries in the secondary particles containing lithium phosphate, or at least 60%, 70%, 80%, 90% or greater than 90% of the open space in the secondary particles contains lithium phosphate. The total weight percentage of the lithium phosphate infused in the secondary particles may be from 0.01 to 5%; or from 0.05 to 1%; or from 0.1 to 0.5%.

Disclosed are lithium phosphate infused Ni-rich NMC cathode materials, cathodes and Li-metal or Li-ion battery systems using the same, and methods of making the cathode materials.

In general, embodiments of the disclosed cathode materials comprise nickel (Ni)-rich LiNiXMnYCoZO2 (NMC) having primary and secondary particles, wherein there are open spaces between the plurality of primary particles within the secondary particle and wherein the secondary particles have a coating of lithium phosphate on an outer surface and lithium phosphate infused in spaces between primary particles within the secondary particle. In certain embodiments the lithium phosphate infuses or penetrates into the spaces in the secondary particles. Infused lithium phosphate blocks the entrance of electrolyte into the particle to prevent it from entering the spaces between primary particles during the lithium intercalation/deintercalation process and aids in preventing the formation of a solid electrolyte interphase (SEI) layer between the primary particles. Formation of an SEI layer between the primary particles leads to continuous cracking within the secondary particles. In certain embodiments the disclosed cathode material consists essentially of LiNiXMnYCoZO2 (NMC, wherein X+Y+Z=1) having primary and secondary particles, and wherein the secondary particles have a coating of lithium phosphate on an outer surface and lithium phosphate infused along the grain boundaries of primary particles within the secondary particles. As used herein, "consists essentially of" means excluding other components that significantly contribute to the functions performed by the NMC and/or the infused lithium phosphate when used to form a cathode in a lithium battery. The function, at least in part, of the NMC in the cathode material is to provide the active lithium sites for reversible lithium ion de-intercalation/intercalation to store/deliver energy during charge and discharge processes. The function of the lithium phosphate coating layer and the diffused solid electrolyte network is to block the entrance route for electrolyte to diffuse along the grain boundaries of primary particles within the secondary particles and effectively alleviate and buffer the detrimental influence from the micro strain generated during the Li+ ion extraction/insertion process, improving the structural integrity and/or the interfacial stability by suppressing the particle crack formation. In certain embodiments the disclosed cathode material consists of LiNiXMnYCoZO2 (NMC, wherein x+y+z=1) having primary and secondary particles, and wherein the secondary particles have a coating of lithium phosphate on an outer surface and/or lithium phosphate infused in spaces along the grain boundaries of the primary particles within the secondary particles.

In certain embodiments the lithium phosphate is infused into a crust of the secondary particles. In certain embodiments the lithium phosphate is infused into a mantle of the secondary particles. In certain embodiments the lithium phosphate is infused into the inner core of the secondary particles. In certain embodiments the lithium phosphate is infused into the crust, and/or the mantle and/or the inner core of the secondary particles. In certain embodiments the lithium phosphate coating and/or infused lithium phosphate refers to the resulting atomic layer deposition of lithium phosphate and subsequent annealing, respectively. In certain embodiments the lithium phosphate coating and/or infused lithium phosphate refer to the resulting wet chemical coating of lithium phosphate and subsequent annealing, respectively. In certain embodiments the lithium phosphate coating and/or infused lithium phosphate refer to the resulting solid state mixing with lithium phosphate and subsequent annealing, respectively.

In certain embodiments the nickel (Ni)-rich $LiNi_xMn_yCo_zO_2$ (NMC, X+Y+Z=1) is NMC wherein $0.95 \geq X \geq 0.5$, Y is from 0.025 to 0.3 and Z is from 0.025 to 0.2, in other embodiments X is from 0.6 to 0.9, Y is from 0.1 to 0.2 and Z is from 0.07 to 0.15, in other embodiments X is from 0.65 to 0.85, Y is from 0.1 to 0.15 and Z is from 0.1 to 0.15. In other embodiments the X, Y and Z values differ from those stated above. In certain embodiments the nickel-rich NMC comprises $LiNi_{0.5}Mn_{0.3}Co_{0.2}O_2$, $LiNi_{0.6}Mn_{0.2}Co_{0.2}O_2$, $LiNi_{0.6}Mn_{0.25}Co_{0.15}O_2$, $LiNi_{0.7}Mn_{0.2}Co_{0.1}O_2$, $LiNi_{0.7}Mn_{0.25}Co_{0.05}O_2$, $LiNi_{0.7}Mn_{0.15}Co_{0.15}O_2$, $LiNi_{0.76}Mn_{0.14}Co_{0.10}O_2$, $LiNi_{0.8}Mn_{0.1}Co_{0.1}O_2$, $LiNi_{0.9}Mn_{0.05}Co_{0.05}O_2$, $LiNi_{0.95}Mn_{0.025}Co_{0.025}O_2$ or any combination thereof.

The disclosed cathode material NMC includes primary and secondary particles. In certain embodiments the primary particles exhibit irregular or various shapes with generally an average particle size of from 50 to 1000 nm or from 100 to 500 nm. In certain embodiments the nickel-rich NMC includes secondary particles formed of a plurality of primary particles such that the secondary particles generally have an average diameter of from 2 to 15 microns, or from 5 to 15 microns, or from 10 to 15 microns. The secondary particles of the NMC include open spaces within the particles, typically between the primary particles, some or all of which the lithium phosphate infuses in the disclosed embodiments.

In certain embodiments the lithium phosphate coating comprises an ALD material formed from the deposition of lithium tert-butoxide (LiO$^t$Bu) and trimethylphosphate (TMPO) as precursors in other embodiments the lithium phosphate coating is the material formed by a solid mixing method or a wet coating method using lithium hydroxide (LiOH) and ammonium dihydrogen phosphate ($NH_4H_2PO_4$) as precursor; or lithium nitrate ($LiNO_3$), ammonium phosphate dibasic (($NH_4)_2HPO_4$) and $NH_4OH$ as a pH control; or nano-sized $Li_3PO_4$ solid powder. In certain embodiments the $Li_3PO_4$ for coating further includes $LiMnPO_4$, $LiCoPO_4$, $LiNiPO_4$, $TiO_2$, $IrO_2$, $ZrO_2$, $Al_2O_3$, $AlF_3$, or $CrO_2$ in the interface between $Li_3PO_4$ coating layer and the NMC crystal. In certain embodiments the coating comprises, consists essentially of or consists of lithium phosphate. As used here, "consists essentially of" means excluding other components that significantly contribute to the functions performed by the lithium phosphate coating. In certain embodiments of the disclosed infused lithium phosphate NMC cathode materials (or cathodes) the coating after annealing treatment has a thickness of from 0.5 to 50 or from 1 to 15, or from 2 to 5 nm.

In certain embodiments the infused lithium phosphate is diffused by the annealing of the lithium phosphate coating. In some embodiments the $Li_3PO_4$ is an ALD coated material. In other embodiments the infused lithium phosphate is the material formed by annealing a lithium phosphate coating formed by a solid mixing method or a wet coating method. In certain embodiments coating comprises, consists essentially of, or consists of, lithium phosphate. As used here, "consists essentially of" means excluding other components that significantly contribute to the functions performed by the lithium phosphate coating. In certain embodiments the infused lithium phosphate fills at least a portion of open spaces in the crust of the secondary particles, such as over 10% or 20% or 30% or 40% or 50% of space in the crust of the secondary particles, or at least 60%, 70%, 80%, 90% or greater than 90% of the previously open space in the crust of the secondary particles. In certain embodiments the infused lithium phosphate fills at least a portion of the mantle of the secondary particles, such as over 10% of space in the mantle of the particles, or at least 15%, 20%, 30%, 40%, or even greater than 50% or 90% of the open space in the mantle of the secondary particles. In certain embodiments the infused lithium phosphate is present in the inner core of the secondary particles. The infused lithium phosphate acts to protect the cathode material from cracking and/or inhibit or stop other compounds diffusing into or forming in open spaces in the particles and provides superior electrochemical performance as compared to NMC material having a lithium phosphate coating but not infused lithium phosphate (e.g., annealed lithium phosphate in certain embodiments).

In certain embodiments, the cathode materials are made by coating nickel-rich NMC with lithium phosphate by depositing a layer of lithium phosphate by ALD, or by coating in any suitable manner as known to those of ordinary skill in the art having had the benefit of reading this disclosure. The lithium phosphate coated NMC is then annealed. As used herein "annealing" means a heat treatment that enables the infusion of the $Li_3PO_4$ into the secondary particles and fill the open space between the primary particles. In certain embodiments the lithium phosphate coated NMC is annealed by heating the $Li_3PO_4$ coated materials in a temperature environment of from 400° C. to 1,000° C. or 600° C. to 800° C. or 600° C. to 750° C.

In certain embodiments the disclosed cathodes are formed of the disclosed cathode materials. In certain embodiments the disclosed cathodes comprise the disclosed cathode materials combined with typical dopants (such as Al, Mg, Ti, V, Cr, Fe, Y, Li, F) or other components such as Ni, Mn, and/or Co in the transition metal layer and Li in Li layer, forming layered structure materials according to R-3m space group. The cathodes were prepared by sintering the $Ni_xMn_yCo_z(OH)_2$ precursor and lithium hydroxide at temperatures ranging from 650~1000° C. $Ni_xMn_yCo_z(OH)_2$ precursor was prepared by controlled co-precipitation method using $NiSO_4$, $MnSO_4$, $CoSO_4$, NaOH and $NH_4OH$ as starting materials in a continuously stirred tank reactor.

Also disclosed are lithium-ion or lithium-metal battery systems comprising, in part, the presently disclosed cathodes. Certain embodiments of the disclosed battery systems forming high-voltage lithium (Li) ion batteries (LIB) with high coulombic efficiency (CE), may further comprise a cathode current collector and a non-aqueous electrolyte. The electrolyte may comprise a mixture of one Li salt, a second Li salt, an additive metal (Ma) salt containing Ma cations other than Li ions, and additionally may comprise an organic aprotic solvent or solvent mixture that can form high quality solid electrolyte interphase layers. In certain embodiments the disclosed dual-salt electrolyte contains the salt mixtures of lithium imide and lithium orthoborate in organic solvent mixtures with certain solid or liquid additives. The lithium imide salts include but are not limited to lithium bis(trifluoromethanesulfonyl)imide (LiTFSI), lithium bis(fluorosulfonyl)imide (LiFSI), lithium bis(pentafluoroethyanesulfonyl)imide (LiBETI) and any mixture thereof. The lithium orthoborate salts include but are not limited to lithium bis(oxalato)borate (LiBOB), lithium difluoro(oxalato)borate (LiDFOB) and any mixture thereof. The additives include but are not limited to $LiPF_6$, $NaPF_6$, $KPF_6$, $CsPF_6$, $LiBF_4$, $LiAsF_6$, $LiSbF_6$, $LiAlF_4$, vinylene carbonate (VC), fluoroethylene carbonate (FEC), vinyl ethylene carbonate (VEC), methylene ethylene carbonate (MEC), tetrafluoroethylene carbonate (TFEC), trifluoropropylene carbonate (TFPC), 1,3-propylsultone, 1,4-butylsultone, and mixtures of the additives and any mixture thereof. The organic solvents include but are not limited to carbonates such as ethylene carbonate (EC), propylene carbonate (PC), diethyl carbonate (DEC), dimethyl carbonate (DMC), ethyl methyl carbonate (EMC), dipropyl carbonate (DPG), di(2,2,2-trifluoroethyl) carbonate (DTFEC), or any mixture thereof; sulfones such as dimethyl sulfone (DMS), ethyl methyl sulfone (EMS), tetramethylene sulfone (i.e sulfolane); carboxylates such as methyl butyrate (MB), ethyl propionate (EP); phosphates such as trimethyl phosphate, triethyl phosphate, tributyl phosphate, triphenyl phosphate, tris(2,2,2-trifluoroethyl) phosphate; phosphites such as triphenyl phosphite, tris(2,2,2-trifluoroethyl) phosphite; ethers such as nonafluorobutyl methyl ether, nonafluorobutyl ethyl ether; nitriles such as butyronitrile, succinonitrile; or any mixture thereof.

In certain embodiments of the disclosed LIBs the systems may include an electrolyte comprising a mixture of two lithium salts, a salt additive, and a solvent mixture that is capable of forming solid electrolyte interphase (SEI) layers when the battery system is cycled. In certain embodiments the battery systems include an electrolyte comprising a mixture of LiTFSI-LiBOB salts in ethylene carbonate (EC)-ethyl methyl carbonate (EMC), such as LiTFSI concentrations of from 0.2 to 0.8 mol/L, or 0.4 to 0.6 mol/L; and LiBOB concentration from 0.2 to 0.6 mol/L, or 0.4 to 0.6 mol/L. In certain embodiments the LIBs include an electrolyte comprising an amount (e.g., 0.05 M) of $LiPF_6$ as an additive in a LiTFSI-LiBOB dual-salt/carbonate-solvent-based electrolyte. Addition of $LiPF_6$ facilitates the formation of a passivation layer on the surface of an electrode to prevent further reaction between the electrolyte and the electrode surface.

In certain embodiments the disclosed cathode materials and cathodes made therefrom comprise primary particles and secondary particles formed of a plurality of primary particles, the secondary particles having lithium ion conductive materials diffused therein. In certain embodiments the primary and secondary particles are $LiM^{C1}_xM^{C2}_yM^{C3}_{1-x-y}O_2$ (($M^{C1}$, $M^{C2}$, or $MC^{C3}$=Fe, Mn, Ni, Co, Cr, Ti, Mg, or Al; 0≤x≤1; 0≤y≤1), $LiMn_{2-y}X_yO_4$ (X=Cr, Al, or Fe, 0≤y≤1), $LiNi_{0.5-y}X_yMn_{1.5}O_4$ (X=Fe, Cr, Zn, Al, Mg, Ga, V, or Cu; 0≤y<0.5), $xLi_2MnO_3 \cdot (1-x)LiM^{C1}_yM^{C2}_zM^{C3}_{1-y-z}O_2$ ($M^{C1}$, $M^{C2}$, or $M^{C3}$=Mn, Ni, Co, Cr, Fe, or mixture of; x=0.3-0.5; y≤0.5; z≤0.5), $Li_{4-x}M_xTi_5O_{12}$ (M=Mg, Al, Ba, Sr, or Ta; 0≤x≤1), $MnO_2$, $V_2O_5$, $LiV_3O_8$, $LiM^{C1}_xM^{C2}_{1-x}PO_4$ ($M^{C1}$ or $M^{C2}$=Fe, Mn, Ni, Co, Cr, or Ti; 0≤x≤1), $Li_3V_{2-x}M_x(PO_4)_3$ (M=Cr, Co, Fe, Mg, Y, Ti, Nb, or Ce; 0≤x≤1), $LiVPO_4F$, $LiM^{C1}_xM^{C2}_{1-x}O_2$ (($M^{C1}$ or $M^{C2}$=Fe, Mn, Ni, Co, Cr, Ti, Mg, Al; 0≤x≤1), $Li_2MSiO_4$ (M=Mn, Fe, or Co), $Li_2MSO_4$ (M=Mn, Fe, or Co), $LiMSO_4F$ (Fe, Mn, or Co), $Li_{2-x}(Fe_{1-y}Mn_y)P_2O_7$ (0≤y≤1), or any combination thereof, with the secondary particles having lithium ion conductive materials diffused within the secondary particles.

In other embodiments the cathode material have secondary particles with lithium ion conductive materials that are capable of diffusing into the secondary particles at a temperature below the sintering temperature of the cathode material. The lithium ion conductive materials may comprise $Li_3PO_4$, $Li_2HPO_4$, $Li_2NH_4PO_4$, $LiH_2PO_4$, $Li(NH_4)_2PO_4$, $Na_3PO_4$, $K_3PO_4$, $(NH_4)_3PO_4$, $Li_2SO_4$, $LiFiSO_4$, $Na_2SO_4$, $LiBO_2$, $LiAlO_2$, $LiAlF_4$, LiF, LiCl, NaF, LiTFSI, LiFSI, LiBETI, LiSICON, NaSICON, $Li_7La_3Zr_2O_{12}$, doped $Li_7La_3Zr_2O_{12}$, Li-beta-alumina, $Li_{3x}La_{2/3-x}TiO_3$ (LLTO) (x=0.05 to 0.3), or any combination thereof. In yet other embodiments the cathode materials primary and secondary particles comprise $LiM^{C1}_xM^{C2}_yM^{C3}_{1-x-y}O_2$ (($M^{C1}$, $M^{C2}$, or $M^{C3}$=Fe, Mn, Ni, Co, Cr, Ti, Mg, or Al; $0 \leq x \leq 1$; $0 \leq y \leq 1$), $LiMn_{2-y}X_yO_4$ (X=Cr, Al, or Fe, $0 \leq y \leq 1$), $LiNi_{0.5-y}X_yMn_{1.5}O_4$ (X=Fe, Cr, Zn, Al, Mg, Ga, V, or Cu; $0 \leq y < 0.5$), $xLi_2MnO_3 \cdot (1-x)LiM^{C1}{}_yM^{C2}{}_zM^{C3}{}_{1-y-z}O_2$ ($M^{C1}$, $M^{C2}$, or $M^{C3}$=Mn, Ni, Co, Cr, Fe, or mixture of; x=0.3-0.5; $y \leq 0.5$; $z \leq 0.5$), $Li_{4-x}M_xTi_5O_{12}$ (M=Mg, Al, Ba, Sr, or Ta; $0 \leq x \leq 1$), $MnO_2$, $V_2O_5$, $LiV_3O_8$, $LiM^{C1}{}_xM^{C2}{}_{1-x}PO_4$. ($M^{C1}$ or $M^{C2}$=Fe, Mn, Ni, Co, Cr, or Ti; $0 \leq x \leq 1$), $Li_3V_{2-x}M_x(PO_4)_3$ (M=Cr, Co, Fe, Mg, Y, Ti, Nb, or Ce; $0 \leq x \leq 1$), $LiVPO_4F$, $LiM^{C1}{}_xM^{C2}{}_{1-x}O_2$ (($M^{C1}$ or $M^{C2}$=Fe, Mn, Ni, Co, Cr, Ti, Mg, Al; $0 \leq x \leq 1$), $Li_2MSiO_4$ (M=Mn, Fe, or Co), $Li_2MSO_4$ (M=Mn, Fe, or Co), $LiMSO_4F$ (Fe, Mn, or Co), $Li_{2-x}(Fe_{1-y}Mn_y)P_2O_7$ ($0 \leq y \leq 1$) and wherein the secondary particles include lithium ion conductive materials diffused within the secondary particles.

EXAMPLES AND COMPARISONS

To further illustrate certain embodiments of the disclosed cathode materials, cathodes, battery systems and methods of making the same, and to provide various comparative analyses and data, below are some Examples with comparison test data. In certain embodiments, two steps are used to form the improved, long-term cycle life of Ni-rich NMC cathode materials by forming LPO-infused cathode materials and cathodes. A first step is to coat the surface of secondary particles of Ni-rich NMC (preferably homogeneously), by any manner suitable as known to persons skilled in the art having had the benefit of reading this disclosure. For instance, the coating may be done by atomic layer deposition methods, solid mixing methods and/or wet coating methods. The second step infuses the lithium phosphate into the secondary particles, by, e.g., annealing the coated Ni-rich NMC materials at a raised temperature, such as from 600° C. to 800° C. The annealing promotes formation of a thin and integrated surface layer on the primary particles and within (infused in) the secondary particles. It is this infused (or integrated) lithium phosphate (inside the secondary particles rather than only on the outer surface) that enhances the structural stability and interfacial stability of the Ni-rich NMC cathode materials and cathodes themselves.

Example 1: Lithium Phosphate Infused Ni-Rich $LiNi_{0.80}Mn_{0.10}Co_{0.10}O_2$ Using an ALD Coating Method The Ni-rich NMC used was $LiNi_{0.80}Mn_{0.10}Co_{0.10}O_2$ (NMC811). Deposition of lithium phosphate ($Li_3PO_4$) on NMC powders was performed in a Savannah 100 ALD system (Ultratech/Cambridge Nanotech) using lithium tert-butoxide (LiO$^t$Bu) and trimethylphosphate (TMPO) as precursors. Source temperatures for LiO$^t$Bu and TMPD were 180° C. and 75° C., respectively, and the deposition temperature for the lithium phosphate was 300° C. Before deposition, NMC powders were well spread out in a stainless steel tray, which was put in the center of a reaction chamber. During one ALD cycle, LiO$^t$Bu and TMPO with a pulse time of 2 seconds were alternatively introduced into the reaction chamber, and pulsing of each precursor was separated by a 15 second purge with nitrogen gas. Lithium phosphate with approximately 10 nm thickness (calculated from its growth rate of ~0.07 nm/cycle) was coated on the NMC powders by repeating the above ALD cycle 150 times. The ALD-coated material was then annealed at 600° C. for 2 hours to infuse the LP into the secondary particles along the grain boundaries between the primary particles inside of the secondary particles.

The electrochemical performances were tested in CR2032 coin-type cells. (A coin cell is a small, typically circular-shaped battery. Coin cells are characterized by their diameter and thickness. For example, a 2032 coin cell has a diameter of 20 mm and a height of 3.2 mm.) The electrodes have a loading of 4 to 5 mg cm$^{-2}$ active NMC material, A 1C rate corresponds to 200 mA g$^{-1}$, (A C-rate is a measure of the rate at which a battery is discharged relative to its maximum capacity, A 1C rate means that the discharge current will discharge the entire battery in 1 hour. All cells tested were subjected to 3 formation cycles at a C/10 rate, and then the long-term cycling test was conducted at a C/3 rate. The cutoff voltage ranges were 2.7-4.5 V vs. Li/Li$^+$.

The room temperature cycling performances of cathodes made from pristine NMC material, from lithium phosphate coated NMC material and from this embodiment of the disclosed lithium phosphate infused NMC material are shown in FIG. 1. Specifically, long-term cycling performance of an embodiment of the disclosed lithium phosphate infused cathode (comprising the $LiNi_{0.80}Mn_{0.10}Co_{0.10}O_2$ (NMC811)) versus an untreated but lithium phosphate coated NMC cathode versus an untreated NMC811 (pristine Ni-rich NMC—no coating or annealing/infusion) are shown in FIG. 1 at C/3 after 3 formation cycles at C/10 over the voltage range of 2.7-4.5 V, at room temperature. The results show that the $Li_3PO_4$ solid electrolyte coating and the disclosed treatment to infuse the $Li_3PO_4$ into the secondary particles (amongst the grain boundary of primary particles) via the subsequent annealing (infusion) process significantly improves the long-term cycling stability of Ni-rich cathode material (such as $LiNi_{0.80}Mn_{0.90}Co_{0.10}O_2$).

Figures 2A, 2B, 2C, 2D:
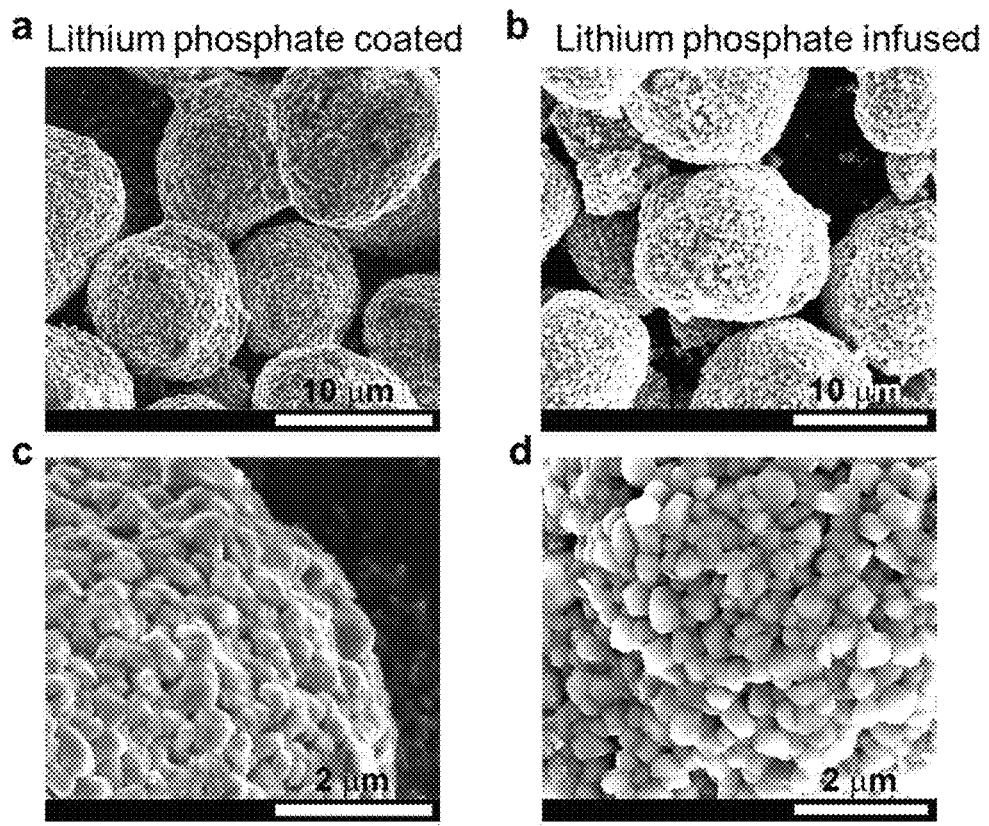
FIGS. 2a-2d are SEM images of a (FIGS. 2a and 2c) lithium phosphate coated NMC and (FIGS. 2b and 2d) a lithium phosphate infused (annealed) $LiNi_{0.80}Mn_{0.10}Co_{0.10}O_2$ embodiment of the disclosed cathodes.
Figures 2E, 2F, 2G, 2H, 2I, 2J:
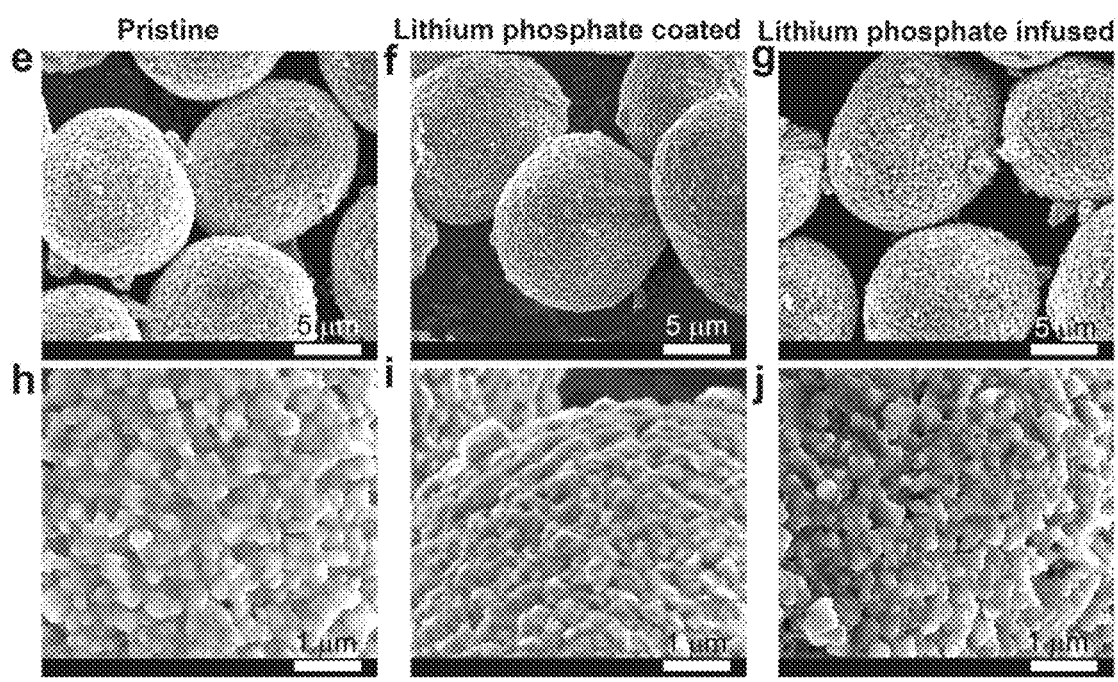
FIGS. 2e-2j are SEM images of NMC samples at different resolutions.

SEM images of the resulting materials and cathodes are shown in FIGS. 2a-2d, showing the morphology of the $Li_3PO_4$ coated Ni-rich $LiNi_{0.80}Mn_{0.10}Co_{0.10}O_2$, FIGS. 2a, 2c show a $Li_3PO_4$ coated material and FIGS. 2b, 2d show an embodiment of the disclosed $Li_3PO_4$ infused $LiNi_{0.80}Mn_{0.10}Co_{0.10}O_2$ cathodes: FIGS. 2a, 2b are images of the secondary particles and FIGS. 2c, 2d are images primary particles.

Figure 3A:
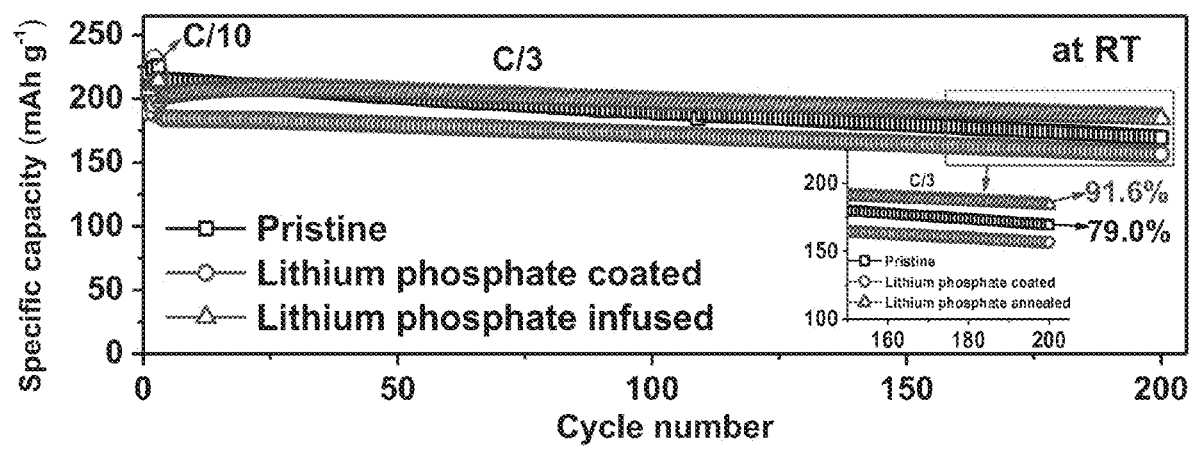
FIGS. 3a-3d.
Figure 3B:
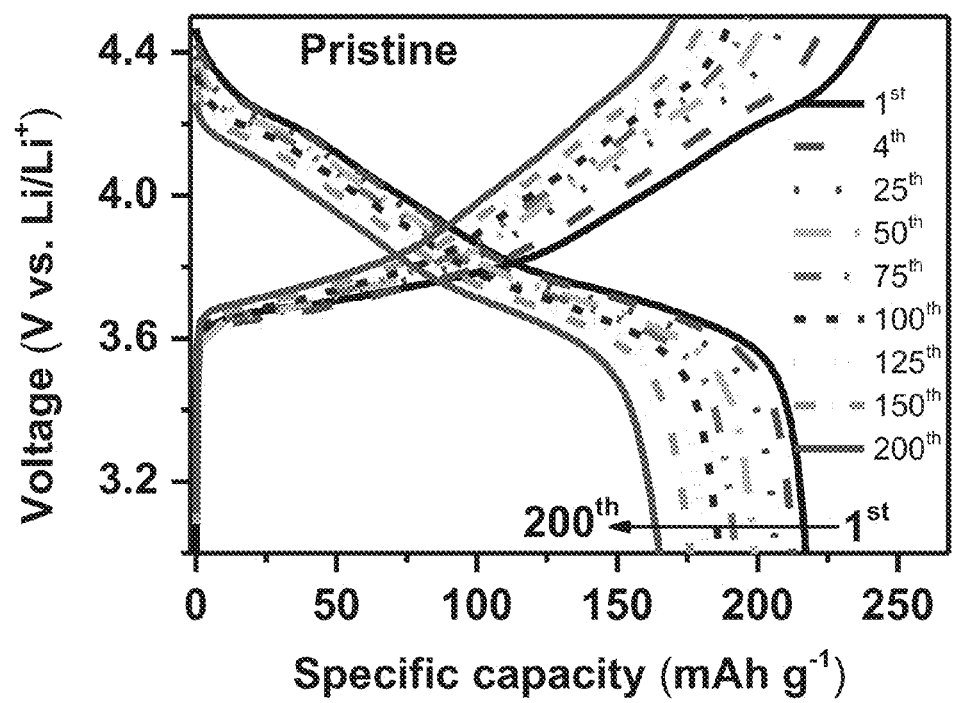
Figure 3C:
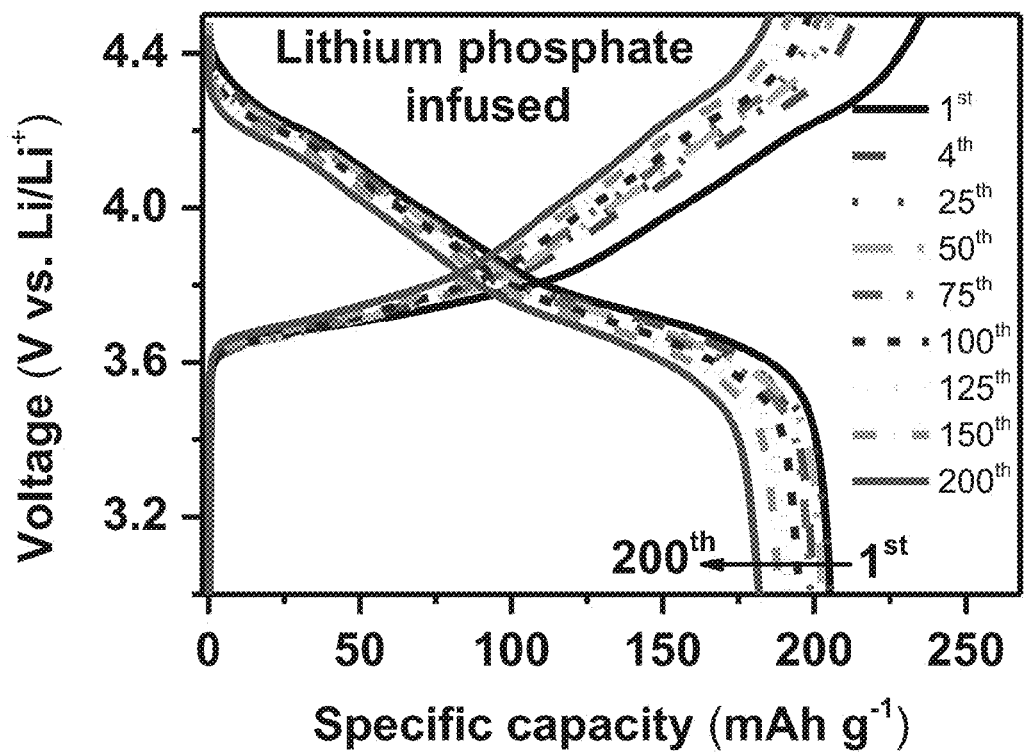
Figure 3D:
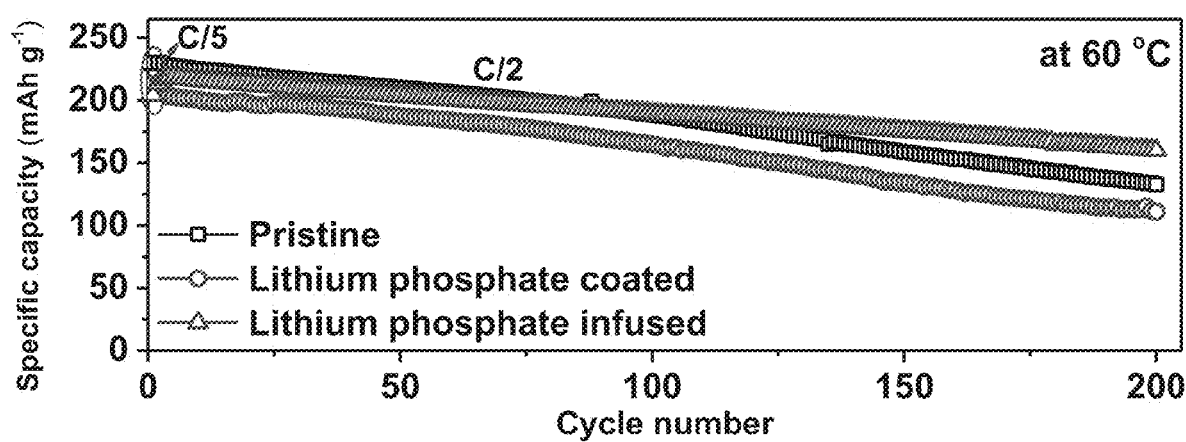

In this second Example the cathodes were made of pristine Ni-rich NMC cathodes with a composition of $LiNi_{0.76}Mn_{0.14}Co_{0.10}O_2$, ALD-lithium phosphate coated Ni-rich NMC, and lithium phosphate infused Ni-rich NMC and then were examined in a coin cell with a charge cut-off voltage of 4.5 V. The results are shown in FIGS. 3a-3d. The room temperature cycling performances of all three materials are presented in FIG. 3a. The pristine Ni-rich NMC material delivers the highest capacity of 219 mAh g$^{-1}$ after the first formation cycle, but exhibits fast capacity decay during the subsequent cycling, retaining only 79.0% after 200 cycles. The lithium phosphate-coated Ni-rich NMC material though shows improved capacity retention (84.8% after 200 cycles), its initial capacity is only 189 mAh g$^{-1}$. After the disclosed annealing treatment is performed on the lithium phosphate-coated Ni-rich NMC material at 600° C. for 2 hours, the obtained LPO-infused Ni-rich NMC cathode material not only shows high charge/discharge capacity (207 mAh g$^{-1}$), but also achieves the best capacity retention (91.6% after 200 cycles). The film formed on the primary particles by infusing of LPO has a thickness in the range of 2 to 5 nm (see FIGS. 4e and 4f). FIGS. 3b and 3c are the charge/discharge voltage profiles of the pristine material and the LPO-infused Ni-rich NMC cathode clearly showing the latter has better cycle stability. Besides, the LPO-infused Ni-rich NMC cathode shows less voltage decay after 200 cycles as compared with the pristine material. FIG. 3d shows the results after long-term cycling of LiNi$_{0.76}$Mn$_{0.14}$Co$_{0.10}$O$_2$ cathodes before and after lithium phosphate coating and annealing treatment at C/2 after 3 formation cycle at C/5 over the voltage range of 2.7-4.5 V at 60° C. At the elevated operation temperature, the LPO-infused Ni-rich NMC cathode also shows the best electrochemical performance. As shown in FIG. 3d, during cycling at high temperature, the pristine Ni-rich NMC material shows faster capacity decay, and only retains 58.3% of its maximum capacity after 200 cycles. With LPO-infused Ni-rich NMC material, the capacity retention after 200 cycles is greatly improved to 73.2%.

To evidence why the three materials discussed above show such different electrochemical performances, comprehensive characterizations using scanning electron microscopy (SEM) and transmission electron microscopy (TEM) were conducted and the underlying mechanism determined. All three materials were first characterized without electrochemical cycling. From the SEM imaging, we can see the secondary particles are relatively similar to one another, indicating that neither the lithium phosphate coating nor the following annealing process changes the secondary particle morphology shown in 2a-2d for LiNi$_{0.80}$Mn$_{0.10}$Co$_{0.10}$O$_2$ and in FIGS. 2e-2j for LiNi$_{0.76}$Mn$_{0.14}$Co$_{0.10}$O$_2$. In terms of primary particles of LiNi$_{0.76}$Mn$_{0.14}$Co$_{0.10}$O$_2$, as shown in FIG. 4a-4g, the Li$_3$PO$_4$-coated material shows a thin coating layer, while the LPO-infused Ni-rich NMC cathode material is similar to the pristine material.

Figures 4A, 4B, 4C, 4D, 4E, 4F, 4G:
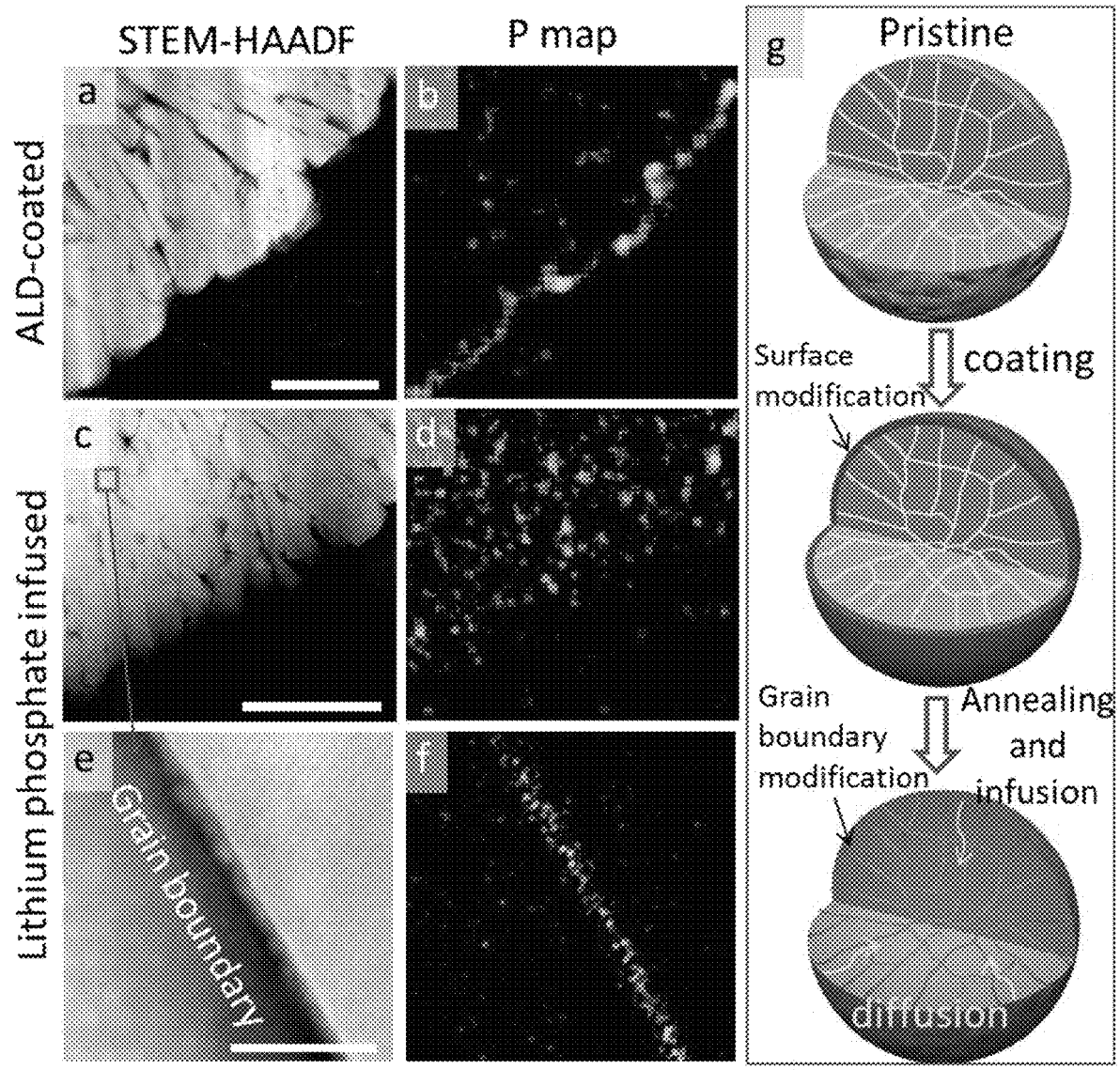
FIGS. 4a-4g show phosphorous distribution in an embodiment of the disclosed cathodes, particularly $LiNi_{0.76}Mn_{0.14}Co_{0.10}O_2$ cathodes, before cycling.

As shown in FIGS. 4a and 4b, a P-enriched surface coating layer is verified from the Li$_3$PO$_4$-coated material with a thickness of around several tens of nanometers. After the disclosed annealing treatment, as shown in FIGS. 4c and 4d, P-enriched regions are found inside of the secondary particle while its surface layer shows negligible P content. At higher magnifications, we identified the P-enriched regions are located at grain boundaries and pockets at triple grain junctions (FIGS. 4e-4f). Thus, the annealing treatment redistributed the coating material from surface into the particle interior, which is likely due to the high diffusion efficiency gained at high temperature. The coating and following annealing also slightly increased the Li/TM (transient metal) interlayer mixing at the outmost surface layer in the lithium phosphate infused material electrode as compared with the pristine one, FIG. 4g illustrates the major changes that occurred on a secondary particle after coating and annealing. For the Li$_3$PO$_4$-coated material, its outmost surface layer was modified due to the deposition of Li$_3$PO$_4$ layer. For the lithium phosphate infused material, the major change is at its intergranular grain boundary. Therefore, the improved cycle performance of the disclosed lithium phosphate infused NMC cathodes is predominantly attributed to grain boundary modification.

Further Analyses and Characterization of the Example 2 Materials.

Figures 5F, 5G:
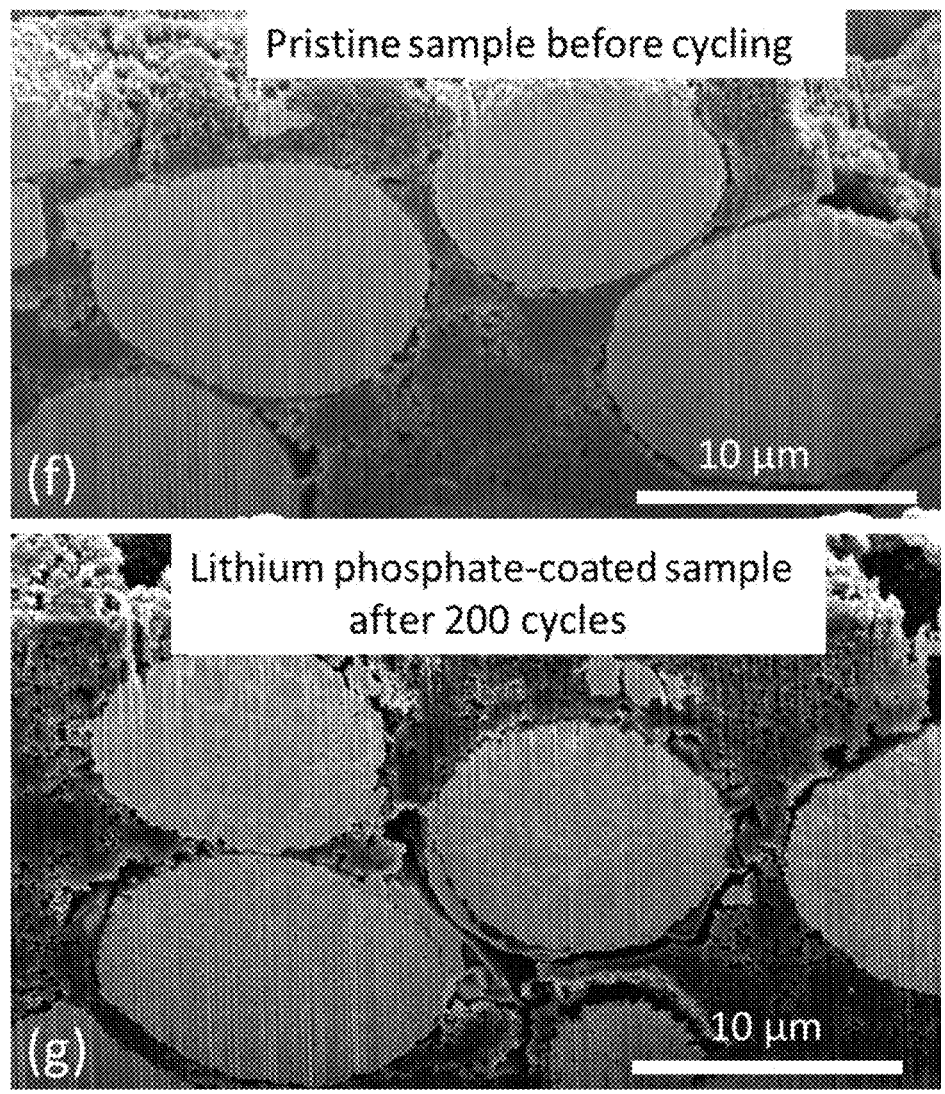
FIGS. 5f-5g show cross sectional SEM images of (FIG. 5f) a pristine material ($LiNi_{0.76}Mn_{0.14}Co_{0.10}O_2$) prior to cycling and (FIG. 5g) lithium phosphate-coated material after 200 cycles.

After 200 cycles electrochemical test, all three cathodes were disassembled for further characterization. FIGS. 5a-5b are secondary particle cross-sectional SEM images with FIG. 5a being the pristine material after 200 cycles and FIG. 5b being a lithium phosphate infused embodiment of the disclosed cathode material after 200 cycles. Distinctive features are observed from cross sectional SEM imaging among the three cycled materials. High-density cracks were observed in the cycled pristine material (FIG. 5a). As a contrast, the cycled Li$_3$PO$_4$-coated and the lithium phosphate infused (annealed) materials are similar to the pristine material before cycling, no crack was formed after 200 cycles. The cross sectional SEM images of pristine material before cycling, and the cycled lithium phosphate coated material are shown in FIG. 5f, and FIG. 5g, respectively. Without cracking, the lithium phosphate-coated material and the lithium phosphate infused (anneal treated) material preserve their original morphology even after 200 cycles. Cracking has been one of the major structural degradation mechanisms leading to cathode failure during cycling because the newly generated cracks not only can result in poor electrical conductivity but also act as new sites for cathode/electrolyte side reactions. The side reaction products can form a thick SEI layer on cathode particles, changing the cathode interfacial electrochemistry.

Electrochemical impedance spectroscopy (EIS) measurements were conducted on all three material electrodes, in which a high-frequency semicircle, an intermediate-frequency semicircle and low-frequency tails are observed as shown in FIGS. 5c-5e. The high-frequency semicircle is related to the passivation surface film, the so-called SEI layer resistance ($R_{SE1}$). The intermediate-frequency semicircle is ascribed to the charge transfer resistance ($R_{ct}$) in the electrode/electrolyte interface. The low-frequency tail is associated with the Li$^+$ ion diffusion process in the solid electrode. Compared with the pristine material, the lithium phosphate infused (treated & annealed) material shows much slower increase of the SEI layer resistance and the charge-transfer resistance. Thus, the structure and interface of lithium phosphate infused Ni-rich NMC cathode materials are well maintained during electrochemical cycling.

Figures 6A, 6B, 6C, 6D, 6E, 6F, 6G, 6H:
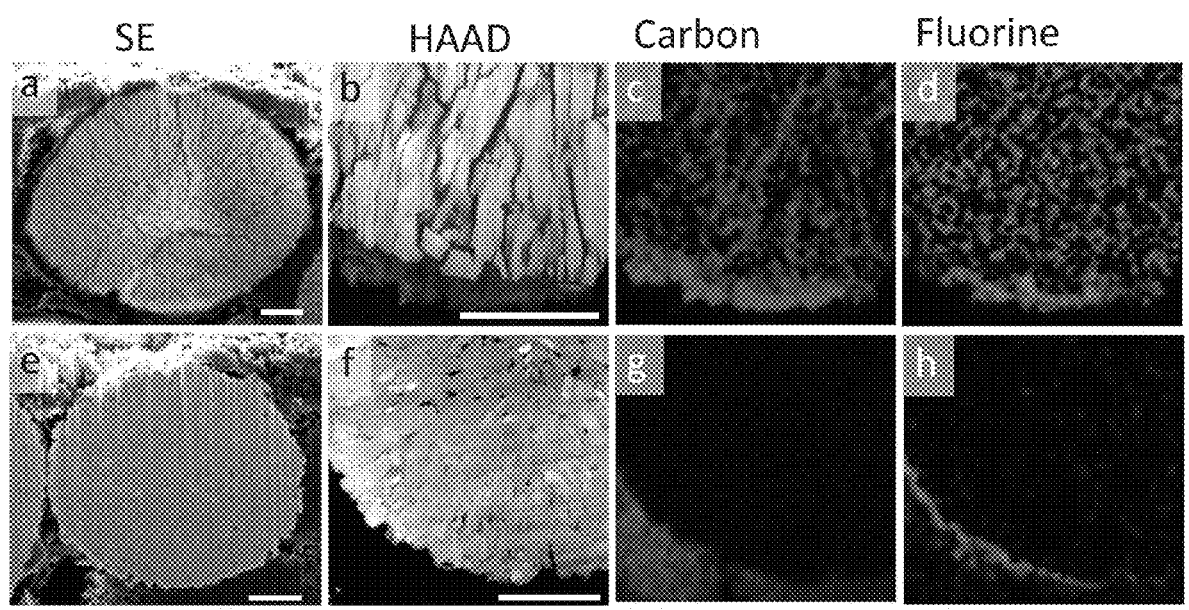
FIGS. 6a-6h illustrate typical cracking induced degradation of differing NMC cathode materials. Shown are cross sectional images (with 2 μm scale bars) of various $LiNi_{0.76}Mn_{0.14}Co_{0.10}O_2$ cathodes, 6a is an SEM image, 6b is a STEM-HAADF image and 6c and 6d are corresponding elemental maps from the pristine material electrode after 200 cycles. Cross sectional images are also shown in 6e, which is an SEM image, 6f is a STEM-HAADF image and 6g and 6h are corresponding elemental maps from an embodiment of the disclosed lithium phosphate infused cathode after 200 cycles.

Further TEM characterization on the three cycled Example 2 materials explains the electrochemical performance differences. After 200 cycles, the three materials (pristine, Li$_3$PO$_4$-coated, and lithium phosphate-infused (annealed) are characterized by a variety of TEM techniques. Particularly, the comparison between the cycled pristine material and the cycled lithium phosphate-infused (annealed) material illustrates why the latter material can successfully eliminate intergranular cracking issues and shows improved performance. FIG. 6a shows a typical cross sectional SEM image of a secondary particle from the pristine electrode after 200 cycles, where we can see the intergranular cracks fragmentate the secondary particle. Moreover, with electrolyte penetration into these newly formed cracks, more cathode/electrolyte side reactions will occur, which is evidenced by the STEM-EDS elemental mapping. As shown in FIGS. 6b-d, carbon-enriched material and fluorine-enriched material, as the side reaction products, were found inside the secondary particle, which are supposed to be Li$_2$CO$_3$, LiF, and LiFPO$_x$ which are the typical components of an SEI formed by the decomposition of electrolyte diffused inside of secondary particles. Due to the accumulation of the SEI layer on the primary particles there poor ionic/electronic conductivity between the primary particles. As a result, electrochemical impedance spectrascopy (EIS) shows that the charge-transfer resistance across the electrode/electrolyte interface increases much faster for the pristine material electrode during cycling (the second semicircles in FIGS. 5c-5e). As a sharp contrast, there are no cracks observed in cross sectional SEM images from the lithium phosphate infused material electrode, even after after 200 cycles, as shown in FIG. 6e. Without intergranular cracks, electrolyte cannot penetrate into the interiors of the secondary particle, thus, cathode/electrolyte side reactions only occur at the outer surface of secondary particles. As shown in FIG. 6f-h, carbon and fluorine are only found at the secondary particle surface. It is notable that in the lithium phosphate coated electrode after 200 cycles there are fewer intergranular cracks and those cracks are smaller, indicating that surface coating provides some beneficial effect on alleviating crack formation (FIG. 5g) but the manner in which such are inhibited (the blocking effect of the thick lithium phosphate coating layer on the secondary particles) causes poor performance in cycling.

Figures 7A, 7B, 7C, 7D, 7E, 7F, 7G, 7H, 7I, 7J, 7K, 7L:
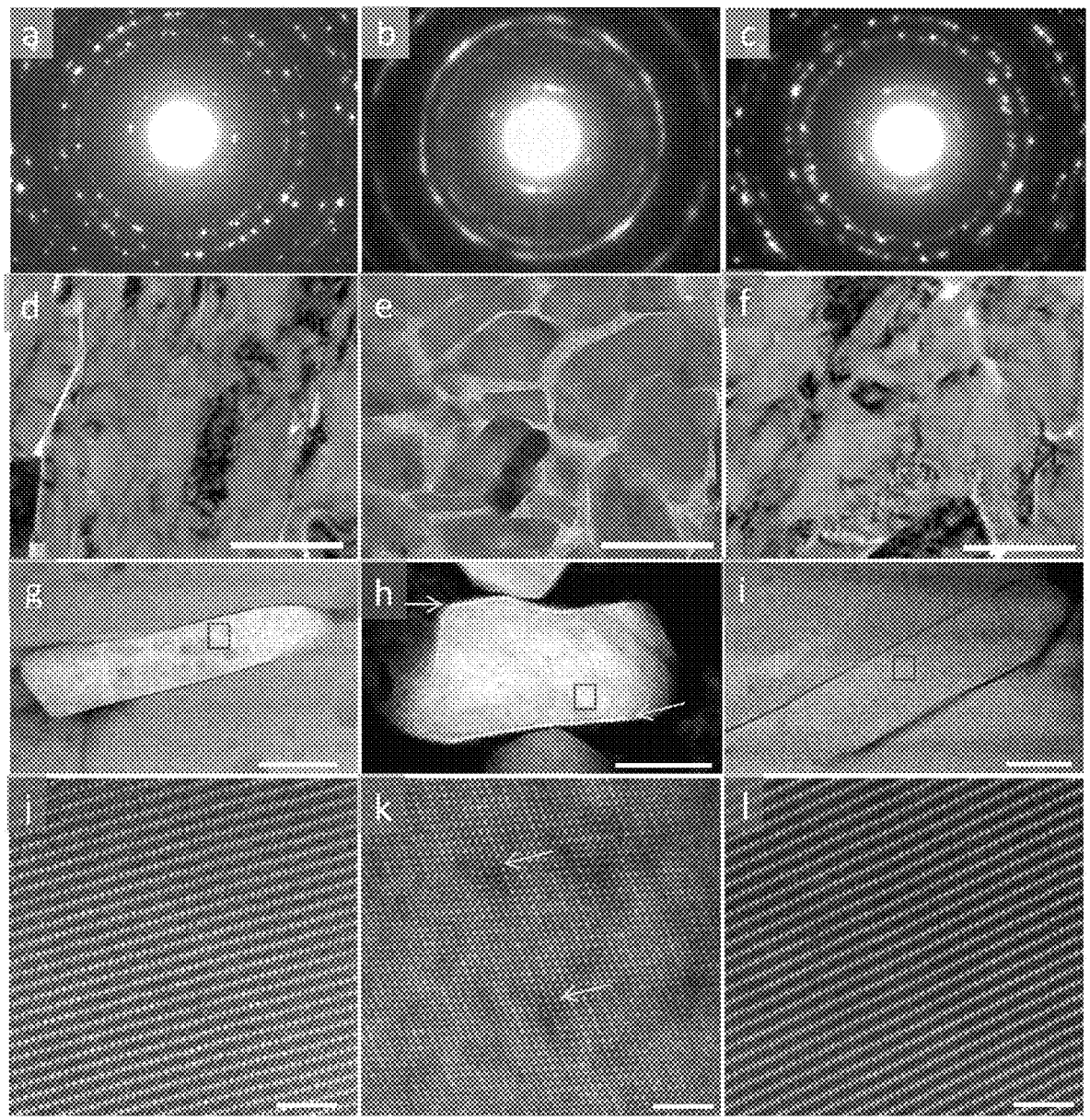
FIGS. 7a-7l. Shown are cycling induced structure degradations with selective area electron diffraction patterns (SAED) from 7a being a pristine electrode ($LiNi_{0.76}Mn_{0.14}Co_{0.10}O_2$) without cycling, 7b a pristine electrode after 200 cycles and 7c an embodiment of the disclosed lithium phosphate infused cathode after 200 cycles. Bright field TEM images are shown with 7d being a pristine cathode without cycling, 7e the pristine electrode after 200 cycles and 7f an embodiment of the disclosed lithium phosphate infused cathode after 200 cycles. Also shown are STEM-HAADF images from 7g of a pristine cathode without cycling, 7h the pristine cathode after 200 cycles and 7i an embodiment of the disclosed lithium phosphate infused cathode after 200 cycles.

Intergranular cracking not only leads to the fragmentation of the secondary particles but also results in the severe structure degradation of primary particles. Detailed comparisons are shown in FIGS. 7a-7l. The pristine electrode material (LiNi$_{0.76}$Mn$_{0.14}$Co$_{0.10}$O$_2$) without cycling is shown in FIGS. 7a, 7d, 7g, 7j, setting as references. The middle series are from the pristine material electrode after 200 cycles (FIGS. 7b, 7e, 7h, 7k). Panels on the right side of the figures are from the LPO-infused material electrode after 200 cycles (FIGS. 7c, 7f, 7i, 7l). Obvious changes were observed for the pristine electrode after 200 cycles from micro meter level down to atomic level. The selective area diffraction patterns (SAED) (FIGS. 7a-7c) are from FIGS. 7d-7f, respectively. Before cycling, the SAED pattern shows good crystallinity by forming dispersive diffraction spots. After 200 cycles, the SAED pattern is featured by the halo rings with intensity fluctuation, indicating poor crystallinity due to severe lattice distortion and defects generation. In FIG. 7e, the bright field TEM image clearly shows the intergranular gaps between primary particles, which are developed during cycling and filled with side reaction products from the electrolyte when cycled. As shown in FIG. 7h, the particle is barely connected to its surrounding particles because of cracking induced fragmentation, which will results in a loss of active material. At the atomic level, the lattice structure has been modified into a rock-salt-like structure as shown in FIG. 7k. Mass redistribution also leads to small void formation as highlighted by the yellow arrows. As a sharp contrast, the tested embodiment of the disclosed lithium phosphate infused electrode after 200 cycles shows very similar features as the pristine electrode without cycling, indicating that the disclosed cathode material is well preserved during cycling, as shown in FIGS. 7c, 7f, 7i and 7l.

Based on the comprehensive microanalysis, without being tied to a particular theory the inventors believe that the lithium phosphate infused Ni-rich NMC electrode materials and electrodes exhibit superior electrochemical performance over the prior art is shown in the evidence disclosed hereinto. First, the active cathode material inside the secondary particle is well preserved during cycling of embodiments of the lithium phosphate infused Ni-rich NMC electrode. Even after 200 cycles, the interior region has no appreciable change (no significant cracking or other changes in morphology) and degradation only occurred at the outermost surface layer of some secondary particles. Second, the annealing process redistributes all or essentially all of the thick lithium phosphate coating layer, which enables fast Li-ion transfer across cathode/electrolyte interface, evidenced by the first cycle EIS shown in FIG. 5c. Third, by filling Li$_3$PO$_4$ solid state electrolyte into the intergranular gaps, diffusion paths of electrolyte are blocked, and grain connection is strengthened, which also acts to enhance Li-ion transfer. In addition, alleviated cathode side reactions also minimize electrolyte decomposition/degradation during cycling. Therefore, the disclosed coating-infusion treatment processes enhance the electrochemical performance of Ni-rich NMC cathodes. From a more general perspective, embodiments of the presently disclosed cathode materials, cathodes and processes provide an important improvement and a new approach through grain boundary engineering, cathode degradation can be mitigated and/or Li-ion diffusion kinetics through highly conductive grain boundary pathways is significantly improved.

Previously it has been proposed that the anisotropic lattice expansion and contraction during charge/discharge causes significant micro strain among the grain boundaries, which gives rise to the severe crack formation. The inventors have determined, however, that for the disclosed LPO-infused (annealed) cathode material, the amount of the lithium content (x in Li$_{1-x}$MO$_2$) that is reversibly used in each charge or discharge process is estimated to be x=0.75-0.80, which is only slightly lower than that for the pristine material. However, with the disclosed LP-infused (annealed) material, no crack formation in the particles was found. The inventors have thus determined that the reason pristine materials generate significant cracks with cycling is not just due to micro strain alone but likely is also facilitated by electrolyte penetration into the particles.

Without being tied to a particular theory but with the belief that the inventors' determinations are correct, as shown in FIG. 4g, for the pristine Ni-rich NMC material, the secondary particles are not fully dense there are intergranular gaps and pockets between the primary particles forming the secondary particles. When the pristine material is subjected to cycling, liquid electrolyte penetrates into these spaces in the secondary particles through a percolation network or grain boundaries of primary particles. During cycling, side reactions, transition metal ion dissolution and strain work together to weaken the grain boundary bonding, leading to increasing crack formation. For the lithium phosphate-coated material and the LPO-infused (annealed) material, as shown in FIG. 4g, due to no or substantially no electrolyte penetration into the (interior of) secondary particles, cracks are not generated. However, the protection mechanism is different between these two materials, for the lithium phosphate-coated material, it is the surface coating layer that slow down electrolyte penetration, while for the LPO-infused (annealed) material, it is because the intergranular gaps and pockets are substantially completely filled during the annealing process by the diffusion of the lithium phosphate coating material into the particles, which blocks the percolation network for electrolyte penetration and improves the strength of the grain-to-grain bonding. As a result, even after 200 cycles, the secondary particles retain superior structural integrity.

Example 3: Functional Electrolyte Improving the Interfacial Stability of Ni-Rich LiNi$_{0.76}$Mn$_{0.14}$Co$_{0.10}$O$_2$ Similar improvement effects of using the Li$_3$PO$_4$-infused treatment was confirmed on a Ni-rich material LiNi$_{0.76}$Mn$_{0.14}$Co$_{0.10}$O$_2$(NMC761410) via the disclosed ALD coating method. As presented in FIG. 3a, pristine LiNi$_{0.76}$Mn$_{0.14}$Co$_{0.19}$O$_2$ material exhibits fast capacity degradation during cycling, retaining only 79.0% after 200 cycles. Right after Li$_3$PO$_4$ coating, although the material shows slightly improved capacity retention (84.8% after 200 cycles), it delivers a largely reduced initial discharge capacity of only 189 mAh g$^{-1}$. This sharp drop in discharge capacity is ascribed to the dramatically increased electrode polarization due to the presence of a resistive solid electrolyte Li$_3$PO$_4$ layer which blocks the fast lithium ion diffusion (FIG. 3a). When the Li$_3$PO$_4$-coated material is further annealed at 600° C. for 2 hours, the solid electrolyte Li$_3$PO$_4$ surface layer melts and homogeneously distribute throughout the whole secondary particle, representing a very thin solid electrolyte $Li_3PO_4$ layer coating on each primary particle, as shown in FIGS. 2a-2f. Therefore, without being tied to a specific theory the inventors believe that the interfacial resistance of the disclosed annealed $Li_3PO_4$-infused material is significantly reduced as compared to the just $Li_3PO_4$-coated material during early stage of cycling. The annealed $Li_3PO_4$-infused material not only is able to deliver a discharge capacity of 207 mAh g$^{-1}$, but achieves significantly better capacity retention (91.6% after 200 cycles). It is this integrated thin layer coating on each primary particle (FIG. 4a-4g) due to the infusion of the lithium phosphate into the secondary particles, rather than only coating on the outer layer of secondary particles, that improves the structural/interfacial stability of Ni-rich NMC materials and enables their long-term stable operation.

Figure 8A:
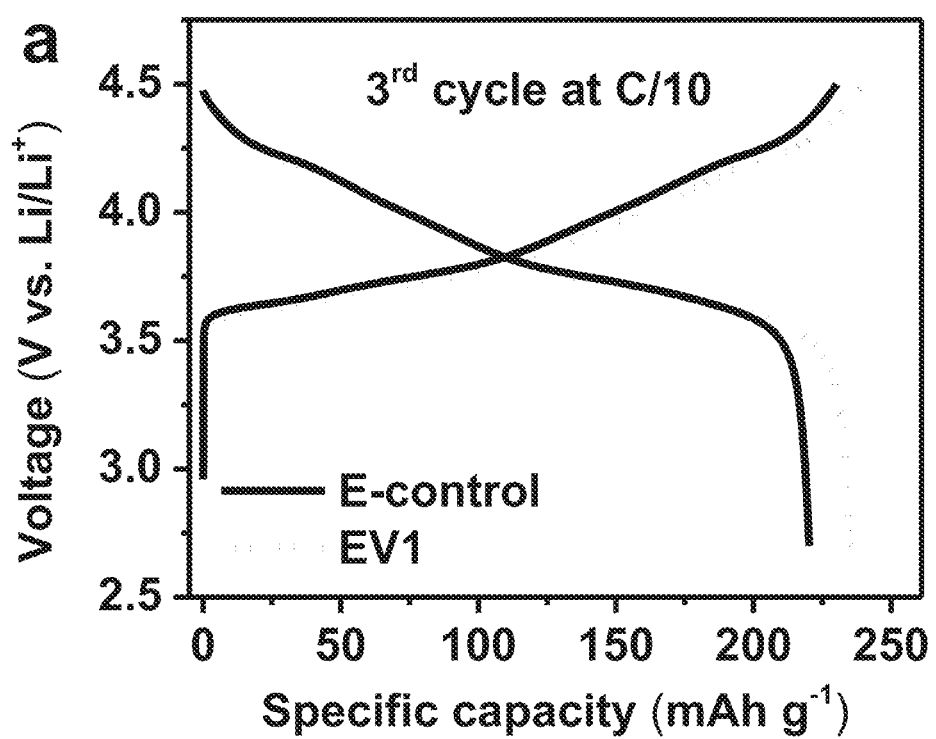
FIG. 8a, FIG. 8a shows third cycle charge/discharge profiles of embodiments of untreated Ni-rich NMC cathode materials (using $LiNi_{0.76}Mn_{0.14}Co_{0.10}O_2$) in different electrolytes at C/10. The embodiments of the electrolytes used were EV1: 0.05 M LiPF6 added dual salt (0.6 M LiTFSI and 0.4 M LiBOB) in EC-EMC (4:6 by wt.) and a control electrolyte of: 1 M $LiPF_6$ in the same EC-EMC (4:6 by wt.) solvent mixture.
Figure 8B:
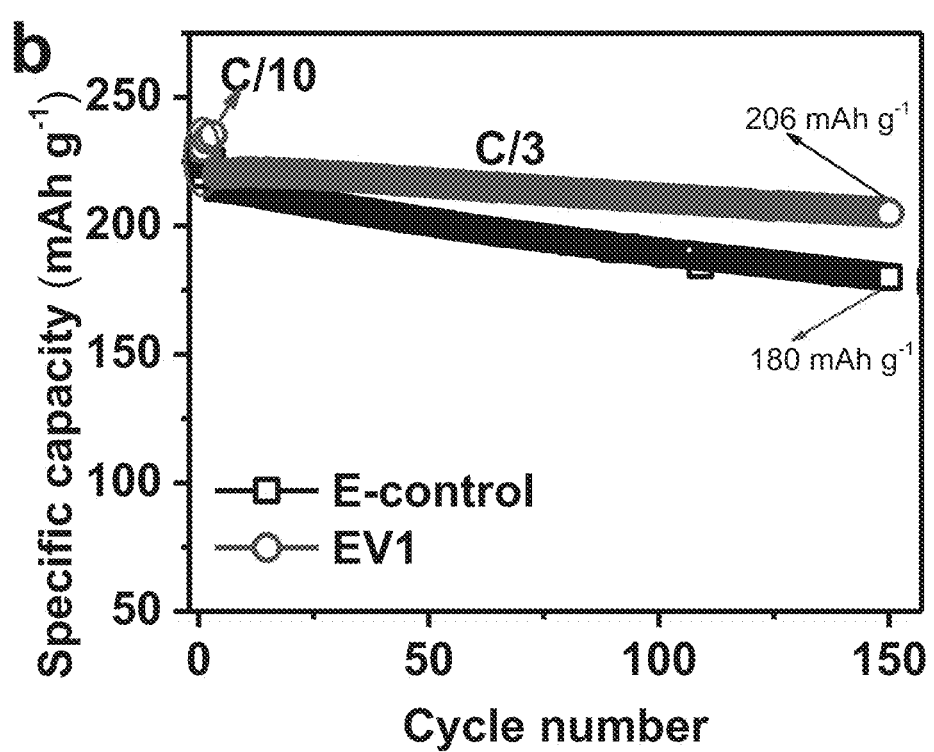
FIG. 8b, FIG. 8b shows long-term cycling performance of embodiments of untreated Ni-rich NMC cathode material (using $LiNi_{0.76}Mn_{0.14}Co_{0.10}O_2$) in the different electrolytes during cycling at C/3 after 3 formation cycles at C/10.
Figure 8C:
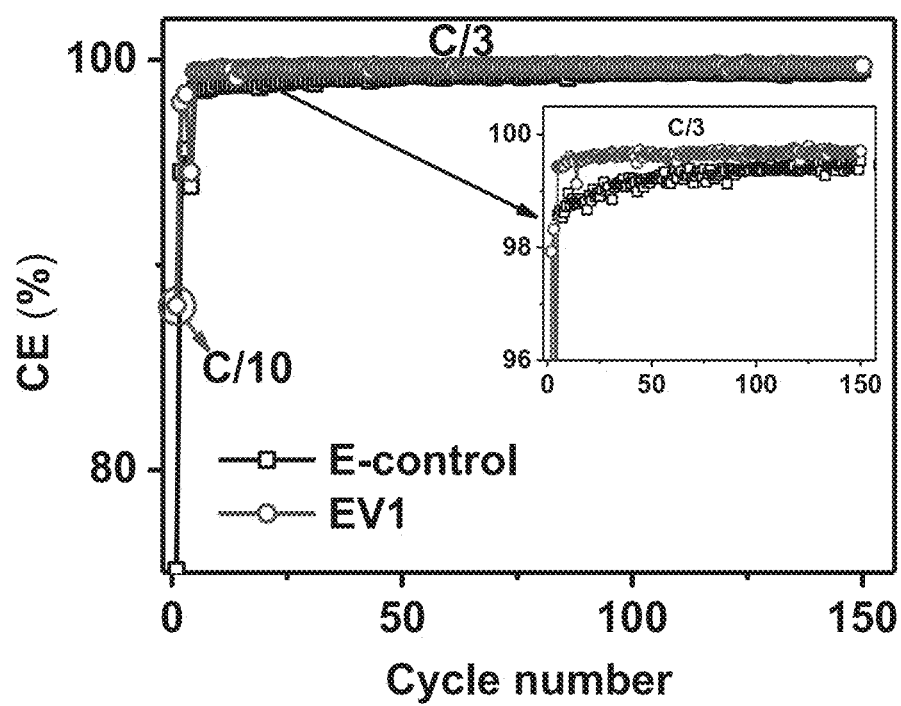
FIG. 8c. Coulombic efficiency (CE) is shown in FIG. 8c as a function of cycle numbers for untreated Ni-rich NMC cathode (using $LiNi_{0.76}Mn_{0.14}Co_{0.10}O_2$) in different electrolytes during cycling at C/3 after 3 formation cycles at C/10.
Figures 9A, 9B, 9C, 9D, 9E, 9F, 9G, 9H:
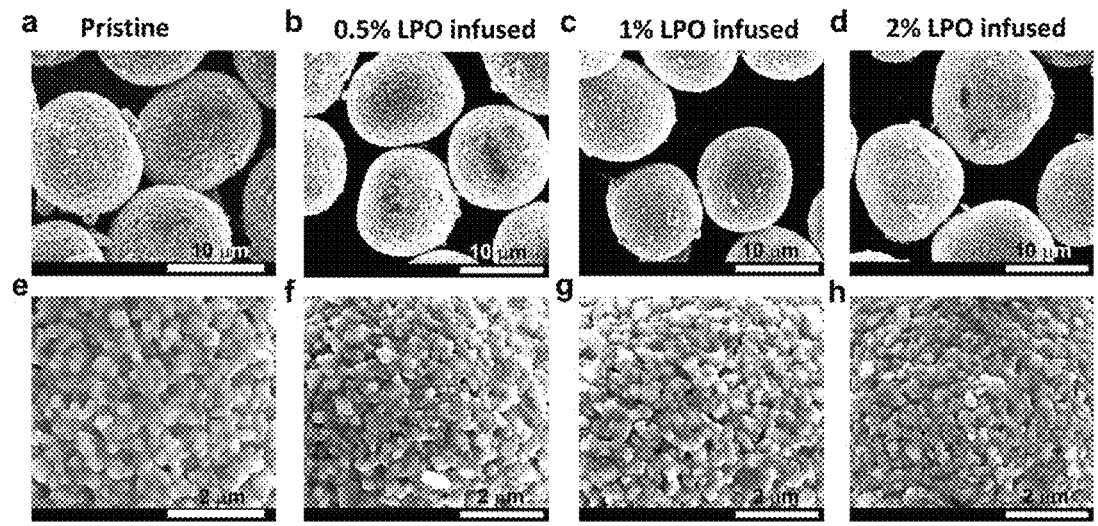
FIGS. 9a-9h. Shown are SEM images where

In another embodiment the cathode materials above had their performances determined and analyzed for operation in certain functional electrolytes, FIG. 8a shows third cycle charge/discharge profiles of embodiments of untreated Ni-rich NMC cathode materials (using $LiNi_{0.76}Mn_{0.14}Co_{0.10}O_2$) in different electrolytes at C/10. The embodiments of the electrolytes used were EV1: 0.05 M $LiPF_6$ added dual salt (0.6 M LiTFSI and 0.4 M LiBOB) in EC-EMC (4:6 by wt.) and a control electrolyte of: 1 M $LiPF_6$ in the same ECEMC (4:6 by wt.) solvent mixture. FIG. 8b shows long-term cycling performance of embodiments of untreated Ni-rich NMC cathode material (using $LiNi_{0.76}Mn_{0.14}Co_{0.10}O_2$) in the different electrolytes during cycling at C/3 after 3 formation cycles at C/10. Coulombic efficiency (CE) is shown in FIG. 8c as a function of cycle numbers for untreated Ni-rich NMC cathode (using $LiNi_{0.76}Mn_{0.14}Co_{0.10}O_2$) in different electrolytes during cycling at C/3 after 3 formation cycles at C/10. Regardless of the formation of cracks in the untreated material during cycling, the functional electrolyte EV1 facilitates the formation of a stabilized SEI layer on the interface of the electrode materials, thus enabling long-term cycling stability of Ni-rich NMC $LiNi_{0.76}Mn_{0.14}Co_{0.10}O_2$.

Example 4: Structural Modification with $Li_3PO_4$ by Solid Mixing Method Starting from NMC(OH)$_2$ Precursor To prepare an embodiment of the disclosed $Li_3PO_4$-infused Ni-rich NMC, first $LiNi_{0.76}Mn_{0.14}Co_{0.10}O_2$ was prepared by using stoichiometric amounts of $Ni_{0.76}Mn_{0.14}Co_{0.10}(OH)_2$ and ammonium phosphate monobasic ($NH_4H_2PO_4$), which were thoroughly mixed with ethanol as a dispersant using a Thinky mixer at 2000 rpm for 30 min. Then a mixture of $Li_3PO_4$-coated $Ni_{0.76}Mn_{0.14}Co_{0.10}(OH)_2$ and LiOH was calcined at 750° C. for 24 hours in air. The amount of $Li_3PO_4$ is 0.5 wt %, 1 wt % or 2 wt % versus to the total weight of $Li_3PO_4$-modified Ni-rich $LiNi_{0.76}Mn_{0.14}Co_{0.10}O_2$. FIGS. 9a-9h are SEM images with FIGS. 9(a, e) being pristine Ni-rich $LiNi_{0.76}Mn_{0.14}Co_{0.10}O_2$ material and FIGS. 9(b, f) being 0.5 wt % $Li_3PO_4$-infused Ni-rich $LiNi_{0.76}Mn_{0.14}Co_{0.19}O_2$ cathode material, FIGS. 9(c, g) being 1 wt % $Li_3PO_4$-infused Ni-rich $LiNi_{0.76}Mn_{0.14}Co_{0.10}O_2$ cathode material, and FIGS. 9(d, h) being 2 wt % $Li_3PO_4$-infused, Ni-rich $LiNi_{0.76}Mn_{0.14}Co_{0.10}O_2$, based on the disclosed hydroxide precursor coating method.

Figure 10A:
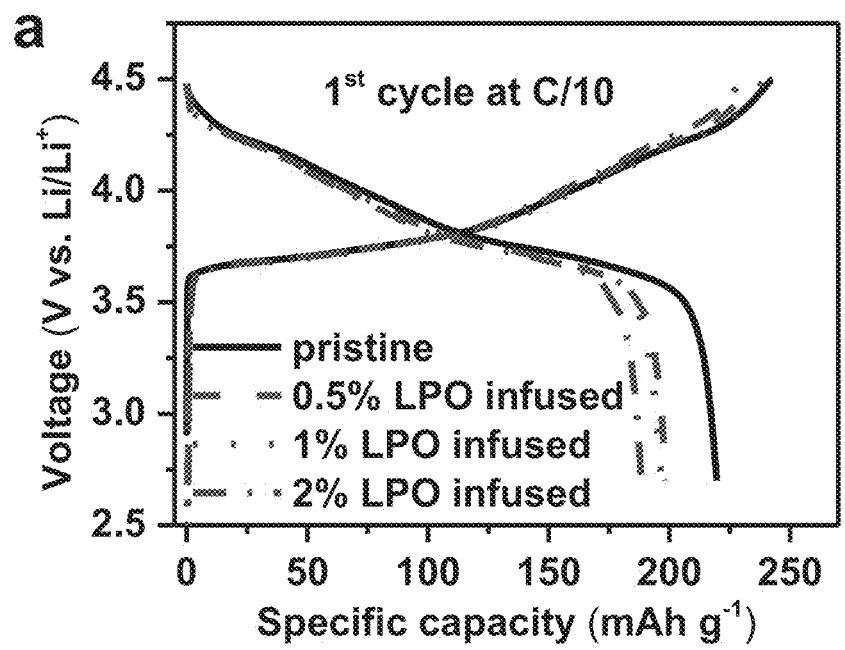
FIGS. 10a-10c.
Figure 10B:
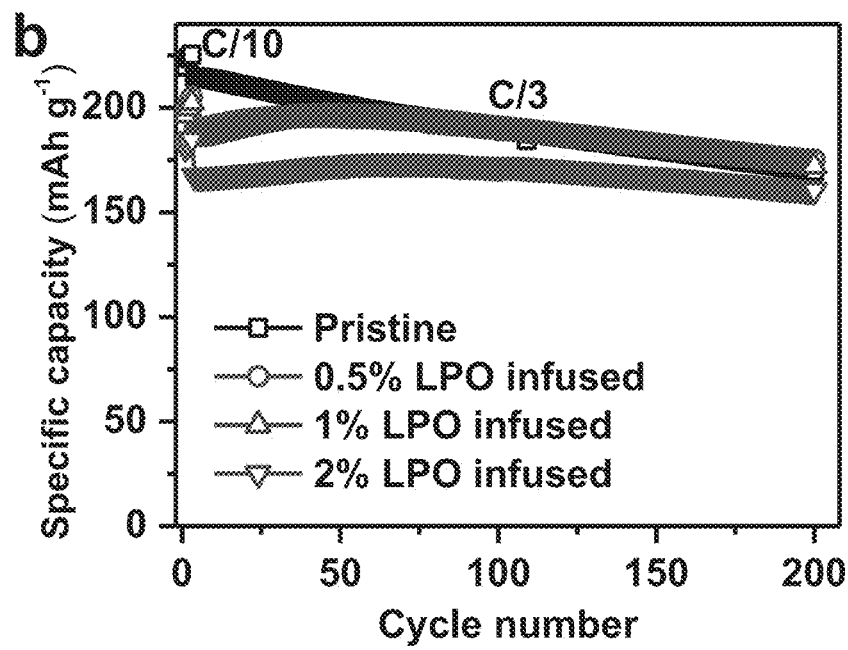
Figure 10C:
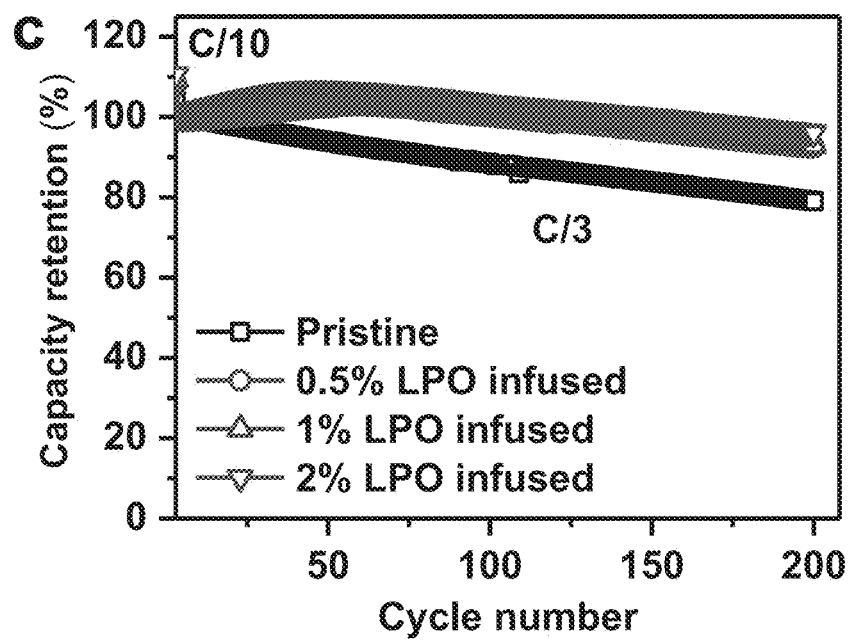

Starting from the precursor, the phosphate source was well mixed with $Ni_{0.76}Mn_{0.14}Co_{0.10}(OH)_2$. After calcination at the high temperature, there is not an obvious coating layer observed on the surface of the $Li_3PO_4$-infused cathode materials as presented in FIGS. 9a-9h. This phenomenon could be due to the fact that the phosphate precursor ($NH_4H_2PO_4$) reacted with LiOH, and diffused into the secondary particles of $LiNi_{0.76}Mn_{0.14}Co_{0.10}O_2$ during the calcination process. The electrochemical performance data, as presented in FIGS. 10a-10c, indicate that the $Li_3PO_4$-infused $LiNi_{0.76}Mn_{0.14}Co_{0.10}O_2$ shows improved long-term cycling stability. FIG. 10a shows initial charge/discharge profiles, FIG. 10b shows discharge capacity vs. cycle number, and FIG. 10c shows capacity retention vs. cycle number for embodiments of $Li_3PO_4$-infused Ni-rich $LiNi_{0.76}Mn_{0.14}Co_{0.10}O_2$, based on the disclosed hydroxide precursor coating method.

FIGS. 11a-11d are SEM images of the pristine Ni-rich $LiNi_{0.76}Mn_{0.14}Co_{0.10}O_2$ material and $Li_3PO_4$-infused (treated) $LiNi_{0.76}Mn_{0.14}Co_{0.10}O_2$ cathode material based on the disclosed hydroxide precursor coating method after 200 cycles at C/3 in the voltage range of 2.7-4.5 V.

Figures 11A, 11B, 11C, 11D:
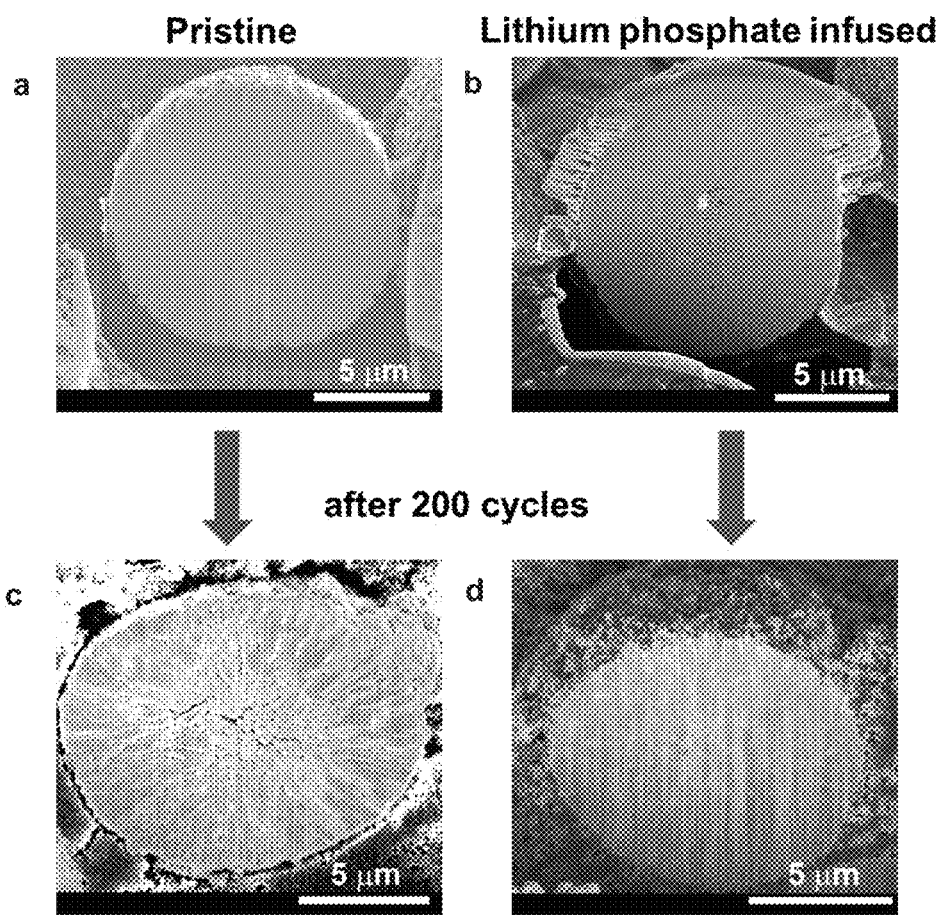
FIGS. 11a-11d are SEM images of a pristine Ni-rich $LiNi_{0.76}Mn_{0.14}Co_{0.10}O_2$ particle and the disclosed lithium phosphate-infused (treated) $LiNi_{0.76}Mn_{0.14}Co_{0.10}O_2$ cathode material particles based on the disclosed hydroxide precursor coating method after 200 cycles at C/3 in the voltage range of 2.7-4.5 V.
Figures 12A, 12B, 12C, 12D, 12E, 12F, 12G, 12H:
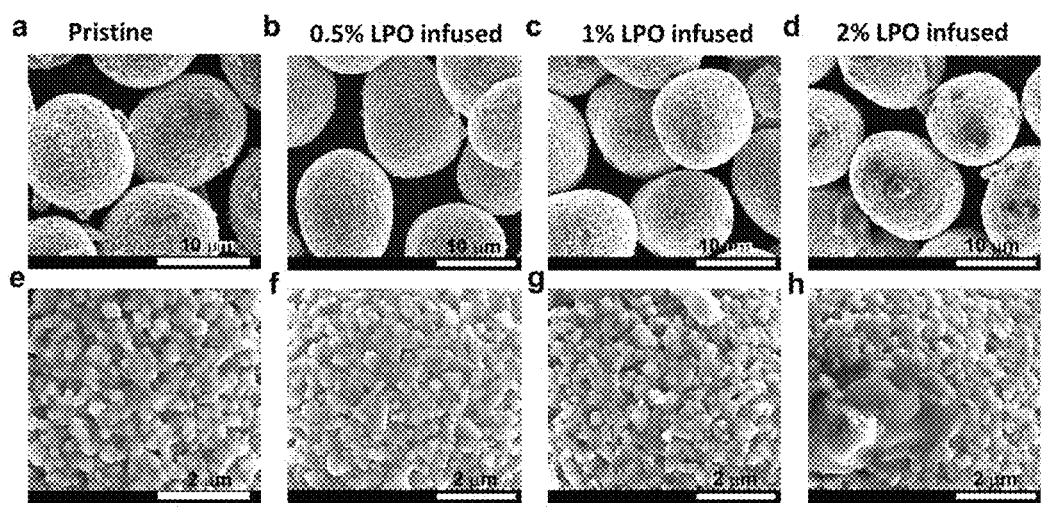
FIGS. 12a-12h are SEM images with FIGS. 12a, 12e being the pristine material, FIGS. 12b, 12f being a 0.5 wt % lithium phosphate-infused Ni-rich $LiNi_{0.76}Mn_{0.14}Co_{0.10}O_2$ cathode material, FIGS. 12c, 12g being a 1 wt % lithium phosphate-infused Ni-rich $LiNi_{0.76}Mn_{0.14}Co_{0.10}O_2$ cathode material, and FIGS. 12d, 12h being a 2 wt % lithium phosphate-infused Ni-rich $LiNi_{0.76}Mn_{0.14}Co_{0.10}O_2$, based on the final $LiNi_{0.76}Mn_{0.14}Co_{0.10}O_2$ cathode material coating method disclosed.

FIG. 11a is the pristine material, and FIG. 11b is the $Li_3PO_4$ infused materials before cycling with FIG. 11c being the pristine and FIG. 11d being the $Li_3PO_4$ infused materials after cycling. The improved cycling stability of $Li_3PO_4$-infused materials is attributed to the enhanced structural integrity, as reflected by the significantly mitigated particle cracking (FIGS. 11a-11d), which is similar to that observed for $Li_3PO_4$-infused counterpart via the disclosed ALD method.

Example 5: Structural Modification with $Li_3PO_4$ by Solid Mixing Method Starting from the Final Product $LiNi_{0.76}Mn_{0.14}Co_{0.10}O_2$ To prepare another embodiment of the disclosed $Li_3PO_4$-infused Ni-rich NMC, specifically $LiNi_{0.76}Mn_{0.14}Co_{0.10}O_2$. Ni-rich $LiNi_{0.76}Mn_{0.14}Co_{0.10}O_2$ and ammonium phosphate monobasic ($NH_4H_2PO_4$) were thoroughly mixed with ethanol as a dispersant using a Thinky mixer at 2000 rpm for 30 min. Then the $Li_3PO_4$-coated $LiNi_{0.76}Mn_{0.14}Co_{0.10}O_2$ was annealed at 750° C. for 2 hours in air. The amount of $Li_3PO_4$ infused was 0.5 wt %, 1 wt % or 2 wt % versus to the total weight of $Li_3PO_4$-infused Ni-rich $LiNi_{0.76}Mn_{0.14}Co_{0.10}O_2$. With 0.5 wt % up to about 1 wt % $Li_3PO_4$-infused Ni-rich $LiNi_{0.76}Mn_{0.14}Co_{0.10}O_2$ materials, the particle morphology is similar to the pristine material, without a coating layer identified. FIGS. 12a-12h are SEM images with FIGS. 12a, 12e being the pristine material and FIGS. 12b, 12f being a 0.5 wt % $Li_3PO_4$-infused Ni-rich $LiNi_{0.76}Mn_{0.14}Co_{0.10}O_2$ cathode material, FIGS. 12c, 12g being a 1 wt % $Li_3PO_4$-infused Ni-rich $LiNi_{0.76}Mn_{0.14}Co_{0.10}O_2$ cathode material, and FIGS. 12d, 12h being a 2 wt % $Li_3PO_4$-infused Ni-rich $LiNi_{0.76}Mn_{0.14}Co_{0.10}O_2$, based on the final cathode material coating method disclosed.

Figure 13A:
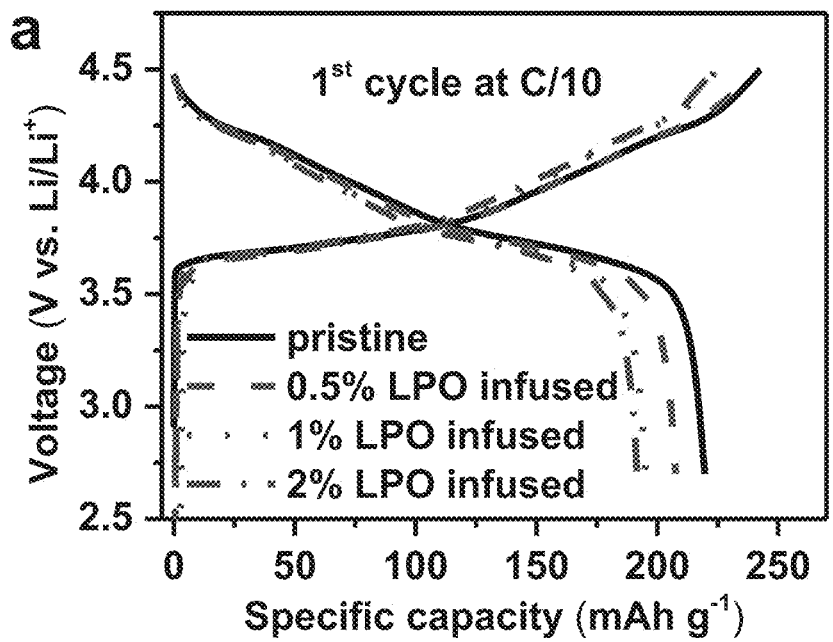
FIGS. 13a-13c.
Figure 13B:
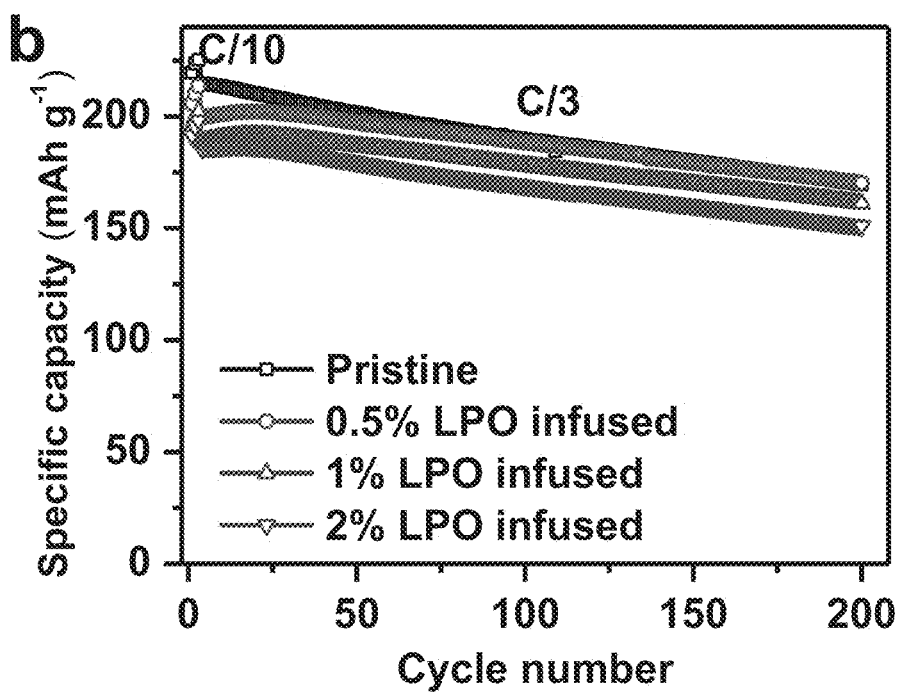
Figure 13C:
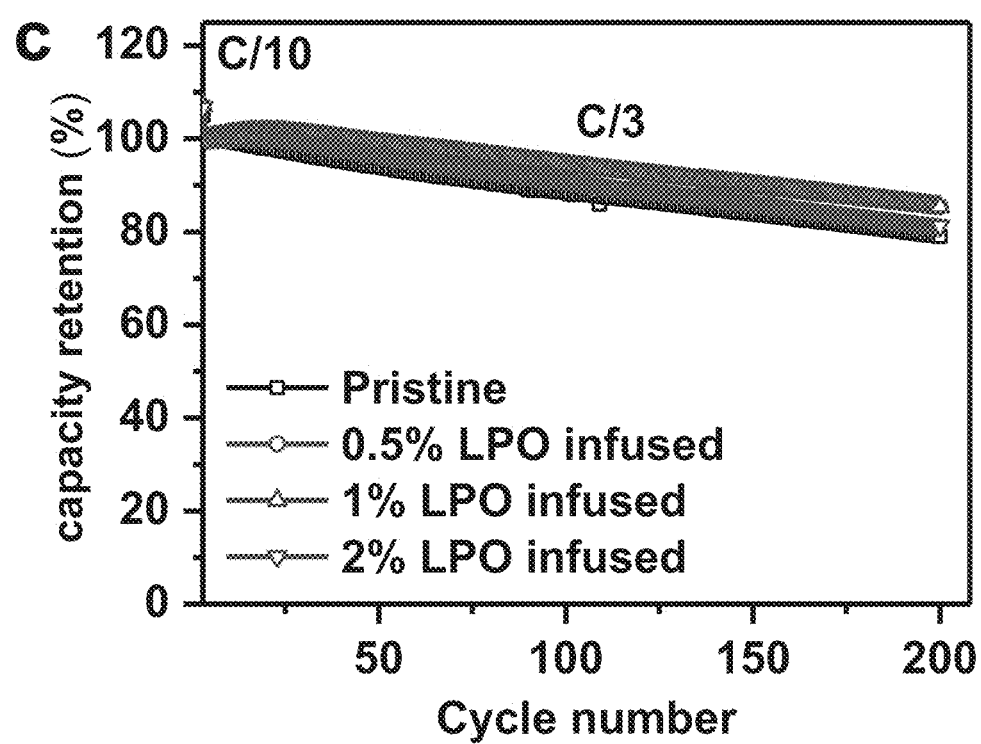

The results suggest that the small coating amount of lithium phosphate could well penetrate and redistribute inside the secondary particles, which acts a positive role in improving the capacity retention of $LiNi_{0.76}Mn_{0.14}Co_{0.10}O_2$ material. However, with the further increase of lithium phosphate content to 2%, some residuals as resulted from the decomposed coating precursors are clearly observed to reside on the surface of NMC particles. This blocks the lithium ion diffusion pathways and affects the prompt $Li^+$ ion transport, leading to lower discharge capacity as well as poor long-term cycling stability (FIGS. 13a-13c). One particularly useful embodiment of the disclosed LPO-infused cathode materials is a lithium phosphate infusion amount of about 0.5%.

Figure 14A:
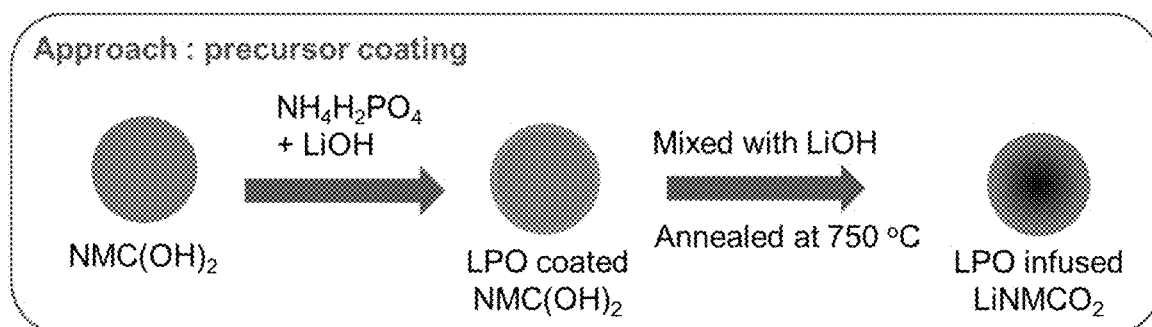
FIGS. 14a-14b.
Figure 14B:
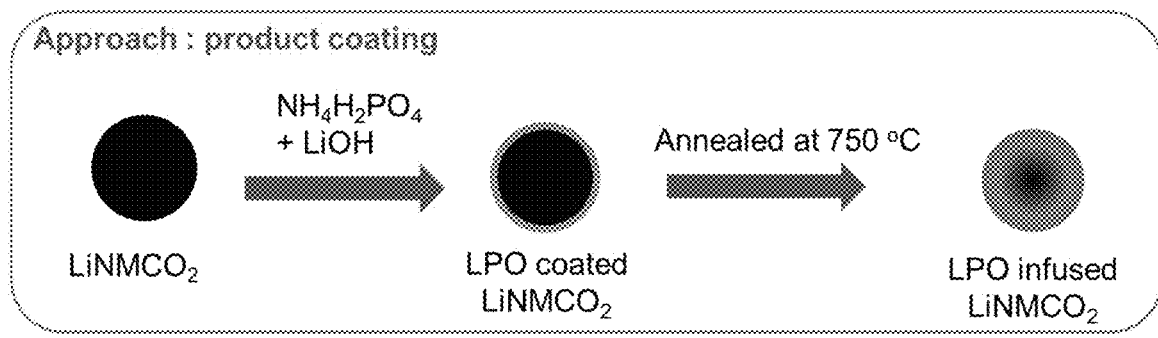

For schematics of certain of the methods of making the disclosed cathode materials, see FIGS. 14a and 14b. FIG.

14a is a schematic illustration showing the structural modification with $Li_3PO_4$ by solid mixing method starting from $NMC(OH)_2$ precursor and FIG. 14b is a schematic illustration showing the structural modification with $Li_3PO_4$ by solid mixing method starting from final cathode material.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A cathode comprising:
a cathode material comprising an NMC having primary and secondary particles, wherein the secondary particles are formed of a plurality of primary particles and the secondary particles have lithium phosphate substantially uniformly distributed among grain boundaries of the primary particles within the secondary particles.

2. The cathode of claim 1 wherein the NMC is nickel-rich NMC and the secondary particles of the NMC do not significantly change morphology after at least 150 cycles in a lithium-ion or a lithium-metal battery system.

3. A lithium battery comprising:
NMC having primary and secondary particles, the secondary particles formed of multiple primary particles;
spaces between the primary particles within the secondary particles; and
lithium phosphate diffused into the spaces between the primary particles within the secondary particles; and
an electrolyte comprising a mixture of two lithium salts, an additive, and a solvent mixture that forms solid electrolyte interphase layers.

4. The lithium battery of claim 3 wherein the two lithium salts comprise lithium imide and lithium orthoborate in an organic solvent mixture.

5. The lithium battery of claim 3 wherein the two lithium salts comprise lithium bis(trifluoromethanesulfonyl)imide (LiTFSI), lithium bis(fluorosulfonyl)imide (LiFSI), lithium bis(pentafluoroethyanesulfonyl)imide (LiBETI), lithium bis(oxalato)borate (LiBOB), lithium difluoro(oxalato)borate (LiDFOB) and any mixture thereof.

6. The lithium battery of claim 3 wherein the additive comprises $LiPF_6$, $NaPF_6$, $KPF_6$, $CsPF_6$, $LiBF_4$, $LiAsF_6$, $LiSbF_6$, $LiAlF_4$, vinylene carbonate (VC), fluoroethylene carbonate (FEC), vinyl ethylene carbonate (VEC), methylene ethylene carbonate (MEC), tetrafluoroethylene carbonate (TFEC), trifluoropropylene carbonate (TFPC), 1,3-propylsultone, 1,4-butylsultone, or any mixture thereof.

7. The lithium battery of claim 3 wherein the solvent comprises carbonate, ethylene carbonate (EC), propylene carbonate (PC), diethyl carbonate (DEC), dimethyl carbonate (DMC), ethyl methyl carbonate (EMC), dipropyl carbonate (DPC), di(2,2,2-trifluoroethyl) carbonate (DTFEC), a sulfone, dimethyl sulfone (DMS), ethyl methyl sulfone (EMS), tetramethylene sulfone; carboxylates, methyl butyrate (MB), ethyl propionate (EP); a phosphate, dimethyl phosphate, triethyl phosphate, tributyl phosphate, triphenyl phosphate, tris(2,2,2-trifluoroethyl) phosphate; triphenyl phosphite, tris(2,2,2-trifluoroethyl) phosphite, an ether, nonafluorobutyl methyl ether, nonafluorobutyl ethyl ether, a nitrile, butyronitrile, succinonitrile, or any mixture thereof.

8. A method for making a lithium battery cathode, comprising:
providing an NMC precursor;
combining the NMC precursor with a lithium source to form a mixture;
sintering the NMC precursor and lithium source mixture to form a nickel-rich NMC particles;
coating the NMC particles with lithium phosphate;
heating the lithium phosphate coated NMC particles in an environment at a temperature between from 600° C. to 800° C. to infuse lithium phosphate from the coating into the NMC cathode material; and
forming a cathode from the lithium phosphate infused NMC cathode material.

9. The method of claim 8 wherein the lithium source is LiOH, $Li_2CO_3$, $LiNO_3$, $Li_2CO_3$, lithium acetate, or any mixture thereof.

10. The method of claim 8 wherein the NMC precursor is $NMC(OH)_2$.

11. The method of claim 10 wherein the precursor $NMC(OH)_2$ is combined with a phosphate source to form a mixture which is then sintered at high temperature to form lithium phosphate coated $NMC(OH)_2$.

12. The method of claim 8 wherein the lithium phosphate coated nickel-rich NMC particles are annealed to form the lithium phosphate infused NMC cathode material.

13. The method of claim 8 wherein the NMC precursor is $NMC(OH)_2$.

* * * * *

UNITED STATES PATENT AND TRADEMARK OFFICE
CERTIFICATE OF CORRECTION

PATENT NO. : 10,734,641 B2  
APPLICATION NO. : 16/284335  
DATED : August 4, 2020  
INVENTOR(S) : Zheng et al.

Page 1 of 1

It is certified that error appears in the above-identified patent and that said Letters Patent is hereby corrected as shown below:

In the Specification

Column 3, Line 52, "with a the phosphate" should read --with the phosphate--.

Column 6, Line 22, "for make the" should read --for making the--.

Column 8, Line 30, "means a secondary" should read --means secondary--.

Column 16, Line 50, "there poor" should read --there is poor--.

Signed and Sealed this  
Ninth Day of February, 2021

Drew Hirshfeld  
*Performing the Functions and Duties of the*  
*Under Secretary of Commerce for Intellectual Property and*  
*Director of the United States Patent and Trademark Office*